US012786751B2

(12) United States Patent
Nair et al.

(10) Patent No.: US 12,786,751 B2
(45) Date of Patent: Nov. 3, 2026

(54) FIRST NODE, DEVICE AND METHODS PERFORMED THEREBY FOR MANAGING ONE OR MORE INDICATIONS

(71) Applicant: Telefonaktiebolaget LM Ericsson (publ), Stockholm (SE)

(72) Inventors: Anil Ramachandran Nair, Bangalore Karnataka (IN); Ramamurthy Badrinath, Bangalore Karnataka (IN); Peter Vaderna, Budapest (HU); Ajay Kattepur, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 263 days.

(21) Appl. No.: 18/698,902

(22) PCT Filed: Oct. 8, 2021

(86) PCT No.: PCT/EP2021/077814
§ 371 (c)(1),
(2) Date: Apr. 5, 2024

(87) PCT Pub. No.: WO2023/057071
PCT Pub. Date: Apr. 13, 2023

(65) Prior Publication Data
US 2024/0406831 A1 Dec. 5, 2024

(51) Int. Cl.
*H04W 24/02* (2009.01)
*H04W 36/00* (2009.01)
*H04W 36/32* (2009.01)

(52) U.S. Cl.
CPC ... *H04W 24/02* (2013.01); *H04W 36/008375* (2023.05); *H04W 36/32* (2013.01)

(58) Field of Classification Search
CPC ......... H04W 24/02; H04W 36/008375; H04W 36/32
See application file for complete search history.

(56) References Cited

U.S. PATENT DOCUMENTS 10,531,318 B1 * 1/2020 Verma .................. H04B 17/318
2012/0252525 A1 10/2012 Fenger et al.
(Continued)

FOREIGN PATENT DOCUMENTS

CN 108462649 A * 8/2018 ......... H04Q 11/0067
WO 2020087432 A1 5/2020

OTHER PUBLICATIONS

Sun et al., Method And Device For Reducing The ONU In The Congestion State At High Priority Data Transmission Time Delay, Jul. 7, 2020, (Year: 2020).*

*Primary Examiner* — Michael A Keller
*Assistant Examiner* — Chhian (Amy) Ling
(74) *Attorney, Agent, or Firm* — Murphy, Bilak & Homiller, PLLC

(57) ABSTRACT

A computer-implemented method performed by a first node (101). The method is for handling managing one or more indications. The first node (101) operates in a communications system (100). The first node (101) determines (304) a scheduling of a transfer of data to or from a device (130) along a predicted route (140). The predicted route (140) is to be followed by the device (130) during a time period. The determining (304) of the scheduling is further based on a type of energy used by a plurality of cells (121, 122) providing radio coverage along the predicted route (140). The first node (101) initiates (305) providing one or more indications to the device (130) based on a first result of the determining (304) of the scheduling. The device (130) receives (402) the one or more indications, determines (403) whether or not to perform the data transfer based on them, and initiates (404) performing the data transfer accordingly.

21 Claims, 13 Drawing Sheets

(56) References Cited

U.S. PATENT DOCUMENTS

| | | | | |
|---|---|---|---|---|
| 2015/0319770 | A1* | 11/2015 | Rune | H04L 47/41 370/335 |
| 2017/0006431 | A1* | 1/2017 | Donovan | H04L 67/5681 |
| 2017/0171793 | A1 | 6/2017 | Hamilton et al. | |
| 2021/0092584 | A1* | 3/2021 | Zou | H04W 36/008375 |
| 2021/0360495 | A1* | 11/2021 | Lovlekar | H04W 36/305 |
| 2023/0354405 | A1* | 11/2023 | Cao | H04W 72/12 |

* cited by examiner a)

b)

FIRST NODE, DEVICE AND METHODS PERFORMED THEREBY FOR MANAGING ONE OR MORE INDICATIONS

TECHNICAL FIELD

The present disclosure relates generally to a first node and methods performed thereby for managing one or more indications. The present disclosure relates generally to a device and methods performed thereby for managing the one or more indications.

BACKGROUND

Computer systems in a communications network may comprise one or more network nodes. A node may comprise one or more processors which, together with computer program code may perform different functions and actions, a memory, a receiving port and a sending port. A node may be, for example, a server. Nodes may perform their functions entirely on the cloud.

The communications network may cover a geographical area which may be divided into cell areas, each cell area being served by another type of node, a network node in the Radio Access Network (RAN), radio network node or Transmission Point (TP), for example, an access node such as a Base Station (BS), e.g. a Radio Base Station (RBS), which sometimes may be referred to as e.g., gNB, evolved Node B ("eNB"), "eNodeB", "NodeB", "B node", or Base Transceiver Station (BTS), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The telecommunications network may also comprise network nodes which may serve receiving nodes, such as user equipments, with serving beams.

The standardization organization Third Generation Partnership Project (3GPP) is currently in the process of specifying a New Radio Interface called Next Generation Radio or New Radio (NR) or 5G-UTRA, as well as a Fifth Generation (5G) Packet Core Network, which may be referred to as 5G Core Network, abbreviated as 5GC.

The demand for data transmissions poses a high demand on energy resources in a telecommunications network, resulting in an impact on the carbon footprint.

SUMMARY

As part of the development of embodiments herein, one or more challenges with the existing technology will first be identified and discussed.

FIG. 1 is a schematic diagram illustrating a high-level overview of the problem space of embodiments herein. Embodiments herein consider a context with a network of base stations that may be connected to either renewable sources such as solar, wind, or non-renewable sources, such as a power grid connections, or to both, in case of hybrid energy sources. It may be beneficial to maximize the use of renewable sources of energy to serve the needs of mobile UEs and/or vehicles. The objective may be understood to be to divert a maximum amount of traffic towards these "green cells" to maximize use of renewable sources of energy. That is, embodiments herein may relate to renewable and hybrid energy scheduling based on traffic.

In view of the foregoing, it is an object of embodiments herein to include mobility and traffic information to efficiently incentivize UEs to utilize green cells more efficiently. It is a further object of embodiments herein to schedule a data transfer at appropriate base stations or UEs to maximize energy and Quality of Experience (QoE) trade-off. It is a particular object of embodiments herein to improve the management of one or more indications in a communications system.

According to a first aspect of embodiments herein, the object is achieved by a method, performed by a first node. The method may be understood to be for managing one or more indications. The first node operates in a communications system. The first node determines a scheduling of a transfer of data to or from a device along a predicted route. The predicted route is to be followed by the device during a time period. The determining of the scheduling is further based on a type of energy used by a plurality of cells providing radio coverage along the predicted route. The first node also initiates providing one or more indications to the device based on a first result of the determining of the scheduling.

According to a second aspect of embodiments herein, the object is achieved by a method, performed by the device. The method may be understood to be for managing the one or more indications. The device operates in one of the communications system. The device node receives, from the first node operating in the communications system, the one or more indications. The one or more indications indicate the scheduling of the transfer of data to or from the device along the predicted route to be followed by the device during the time period. The one or more indications are further based on the type of energy used by the plurality of cells providing radio coverage along the predicted route. The device determines whether or not to perform the data transfer based on the received one or more indications. The device also initiates providing the data transfer according to the second result of the determining.

According to a third aspect of embodiments herein, the object is achieved by the first node. The first node may be considered to be for managing the one or more indications. The first node is configured to operate in the communications system. The first node is further configured to determine the scheduling of the transfer of the data to or from the device along a predicted route configured to be followed by the device during the time period. The determining of the scheduling is configured to be further based on the type of energy configured to be used by the plurality of cells configured to be providing radio coverage along the predicted route. The first node is further configured to initiate providing the one or more indications to the device based on the first result of the determining of the scheduling.

According to a fourth aspect of embodiments herein, the object is achieved by the device. The device may be considered to be for managing the one or more indications. The device is further configured to operate in the communications system. The device is further configured to receive, from the first node configured to operate in the communications system, the one or more indications. The one or more indications are configured to indicate the scheduling of the transfer of data to or from the device along the predicted route to be followed by the device during the time period. The one or more indications are further configured to be based on the type of energy configured to be used by the plurality of cells configured to be providing radio coverage along the predicted route. The device is further configured to determine whether or not to perform the data transfer based on the one or more indications configured to be received. The device is also configured to initiate performing the data transfer according to the second result of the determining.

By determining the scheduling of the transfer of data to or from the device along the predicted route based on the type of energy used by the plurality of cells and then initiating providing the one or more indications to the device, data transmission to or from the device and the other devices may be optimized and the green energy usage may be maximized. The determining of the scheduling may also enable that the base stations and the device and the other devices may perform efficient budgeting of energy and Quality of Service (QOS) of to improve the carbon footprint.

By determining whether or not to perform the data transfer based on the received one or more indications, the device may be enabled to flexibly decide whether or not to follow the recommendation of the first node, or whether to overwrite the recommendation, based on, for example, a change in the route, diverging from the predicted route, or due to another reason.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to the challenges discussed in the Summary section or other challenges. There are, proposed herein, various embodiments which address one or more of the issues disclosed herein.

As a brief overview, embodiments herein may be understood to relate to a green energy aware traffic prediction and data transfer scheduling. For example, during a journey, a UE may consume various data and if the UE tries to get this data mostly from the green cells, it may be understood to increase the usage of renewable energy. If the UEs and base stations manage the data flow in such a way that the green cells are utilized to the maximum, the carbon footprint may be reduced. Given the variations in traffic, green cells may need to optimize and prioritize the energy available with the green cells. In addition, the grid may need to try to minimize the energy usage by the UE by providing the data when the signal strength in the network is strong and the UE may be understood to use less energy to transmit. Hybrid cells may also be referred to as "yellow cells", which may use a mixture of renewable energy and non-renewable energy. If yellow cells exist in the system, the priority may be understood to be in the order green, yellow and then red, i.e., "red cells" may be understood to use only non-renewable energy.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2:
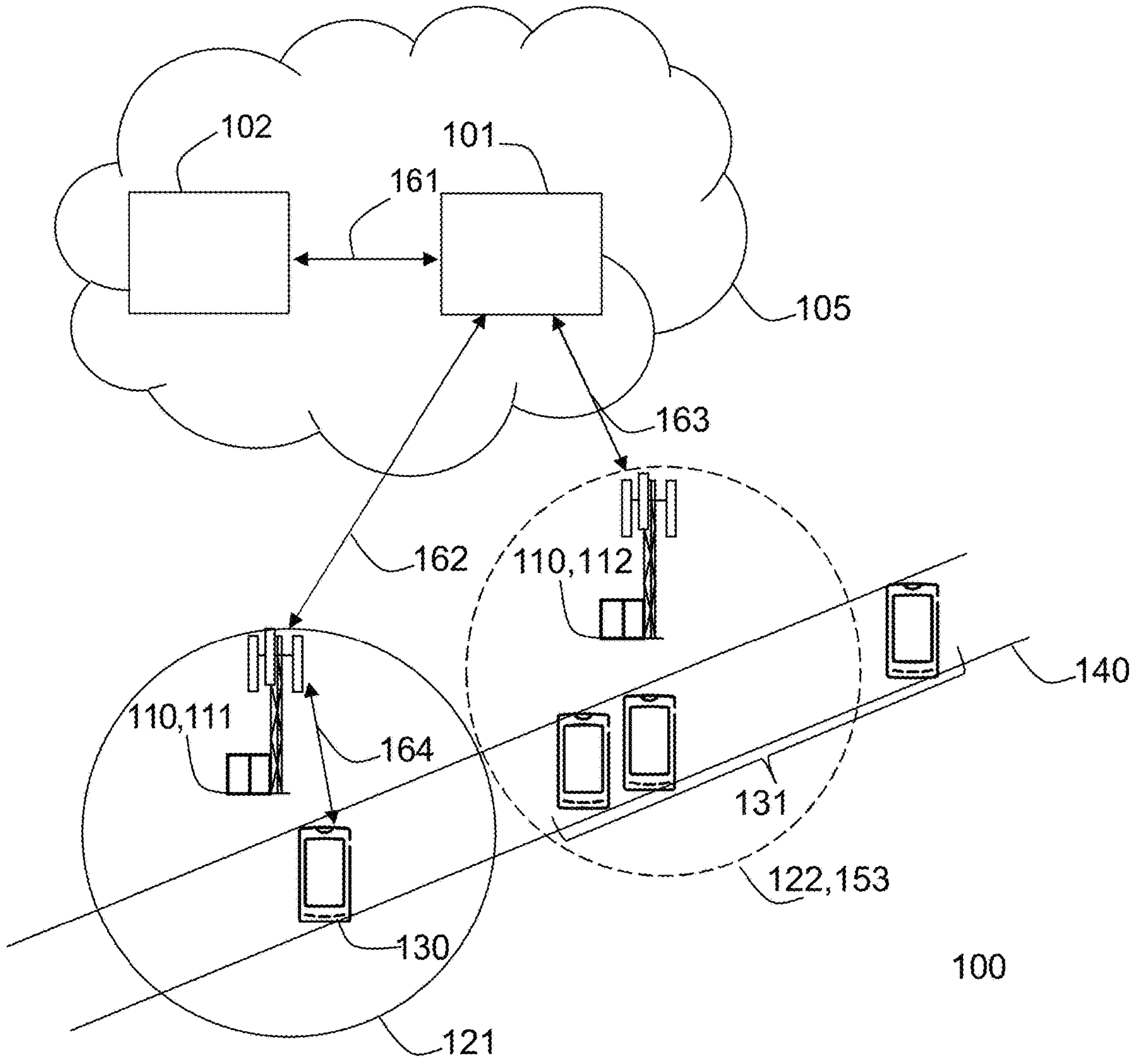
FIG. 2 is a schematic diagram illustrating a communications system, according to embodiments herein.

FIG. 2 depicts a communications system 100 in which embodiments herein may be implemented. In some example implementations, the communications system 100 may be a computer network. In other example implementations, such as that depicted in the non-limiting example of FIG. 2, the communications system 100 may be implemented in a telecommunications system, sometimes also referred to as a telecommunications network, cellular radio system, cellular network or wireless communications system. In some examples, the telecommunications system may comprise network nodes which may serve receiving nodes, such as wireless devices, with serving beams.

In some examples, the telecommunications system may for example be a network such as 5G system, or a newer system supporting similar functionality. The telecommunications system may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system. The telecommunications system may for example support a Low Power Wide Area Network (LPWAN). LPWAN technologies may comprise Long Range physical layer protocol (LoRa), Haystack, SigFox, LTE-M, and Narrow-Band IoT (NB-IoT).

The communications system 100 may comprise a plurality of nodes, whereof a first node 101 and a second node 102 are depicted in FIG. 2. Any of the first node 101 and the second node 102 may be understood, respectively, as a first computer system and a second computer system. In some examples, any of the first node 101 and the second node 102 may be implemented as a standalone server in e.g., a host computer in the cloud 105, as depicted in the non-limiting example depicted of FIG. 2. Any of the first node 101 and the second node 102 may in some examples be a distributed node or distributed server, with some of their respective functions being implemented locally, e.g., by a client manager, and some of its functions implemented in the cloud 105, by e.g., a server manager. In some examples, some of the functions of the first node 101 may be performed in the cloud 105 and some may be performed in a device, such as the device 130 described below. A priority of the device 130 may be considered if there is a conflict. Yet in other examples, any of the first node 101 and the second node 102 may also be implemented as processing resources in a server farm.

Any of the first node 101 and the second node 102 may be independent and separate nodes. In other non-limiting examples, the first node 101 and the second node 102 may be co-localized or be the same node.

It may be understood that the communications system 100 may comprise more nodes than those represented on FIG. 2.

Any of the first node 101 and the second node 102 may be understood as a node that may have a capability to collect and analyze data. In some examples, any of the first node 101 and the second node 102 may have a capability to perform machine learning.

Figure 1:
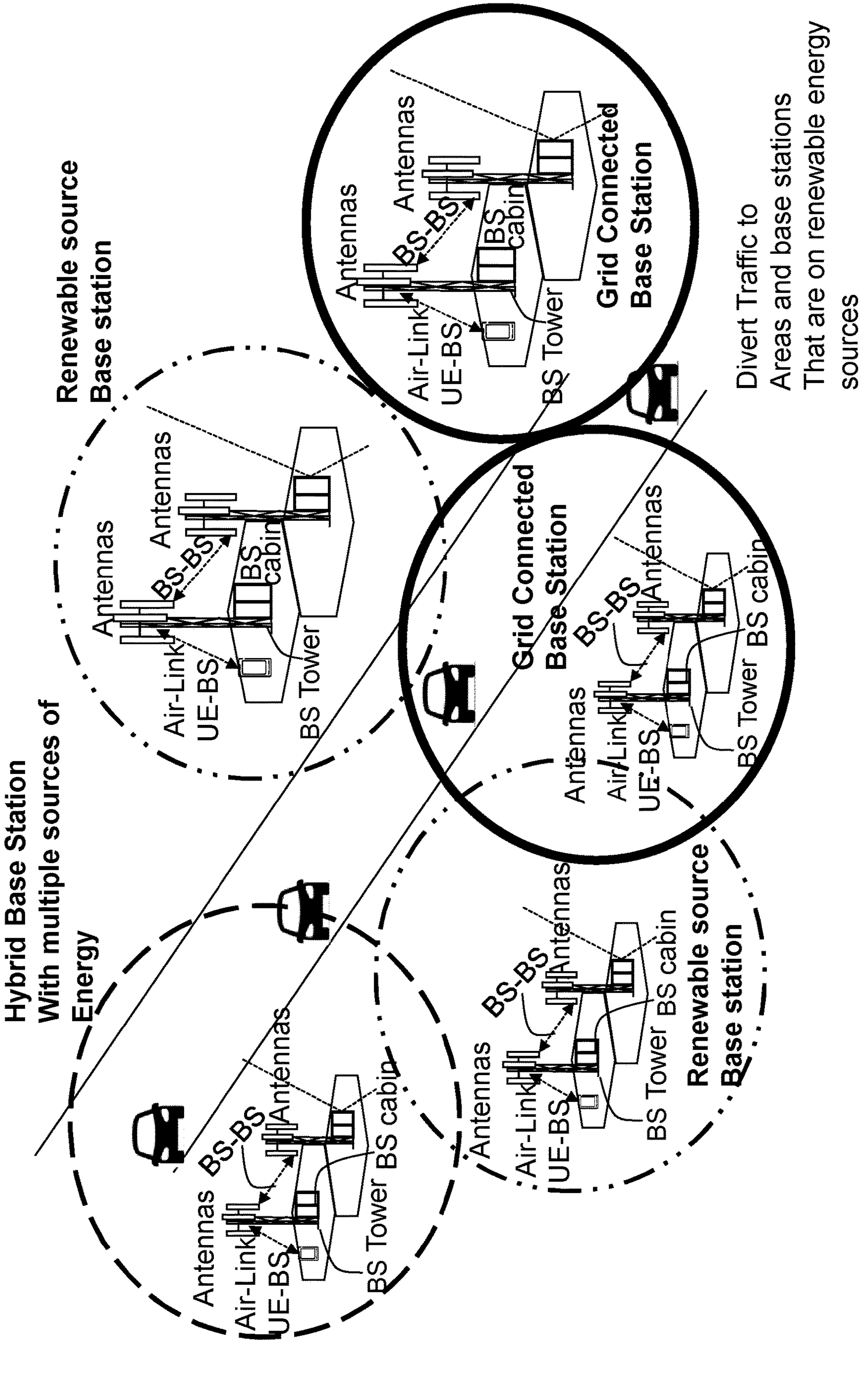
FIG. 1 is a schematic diagram illustrating an example of the problem space of embodiments herein.

The communications system 100 may comprise a plurality of network nodes 110, whereof a first network node 111 and a second network node 112 are depicted in the non-limiting example of FIG. 2. The first network node 111 and the second network node 112 are radio network nodes. A radio network node may be understood as a base station or Transmission Point (TP), such as a radio base station, for example a gNB, an eNB, an eNodeB, or a Home Node B, a Home eNode B, or any other network node with similar features capable of serving a user equipment, such as a wireless device or a machine type communication device, in the communications system 100. In some examples, which are not depicted in FIG. 1, any of the first network node 111 and the second network node 112 may be a distributed node and may partially perform its functions in collaboration with a virtual node in a cloud.

The communications system 100 may cover a geographical area, which is divided into cell areas, wherein each cell area may be served by a radio network node, although, one radio network node may serve one or several cells. In the example of FIG. 2, the first network node 111 serves a first cell 121 and the second network node 112 serves a second cell 122. Any of the first network node 111 and the second network node 112 may be of different classes, such as, e.g., macro eNodeB, home eNodeB or pico base station, based on transmission power and thereby also cell size. In some examples, any of the first network node 111 and the second network node 112 may serve receiving nodes with serving beams. Any of the first network node 111 and the second network node 112 may support one or several communication technologies, and its name may depend on the technology and terminology used. Any of the first network node 111 and the second network node 112 that may be comprised in the communications system 100 may be directly connected to one or more core networks.

The communications system 100 may comprise a plurality of devices whereof a device 130 and other devices 131 are depicted in FIG. 2. Any of the device 130 and the other devices 131 may be also known as e.g., user equipment (UE), a wireless device, mobile terminal, wireless terminal and/or mobile station, mobile telephone, cellular telephone, or laptop with wireless capability, or a Customer Premises Equipment (CPE), just to mention some further examples. Any of the device 130 and the other devices 131 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, CPE or any other radio network unit capable of communicating over a radio link in the communications system 100. Any of the device 130 and the other devices 131 may be wireless, i.e., it may be enabled to communicate wirelessly in the communications system 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications system 100.

The device 130 is mobile and may move along a predicted route 140. Radio coverage along the predicted route 140 may be provided by a plurality of cells 121, 122, which may comprise the first cell 121 and the second cell 122, and may optionally comprise additional cells, which are not depicted in FIG. 1 to simplify the figure. The plurality of cells 121, 122 along the predicted route 140 comprise the first cell 121 and the second cell 122. As the device 130 moves along the predicted route 140, at any given position along the predicted route 140, the device 130 may have an expected next cell 153. In the non-limiting example of FIG. 2, the expected next cell 153 of the device 130 is the second cell 122, although this may be understood to be an example for illustrative purposes only.

The first node 101 may communicate with the second node 102 over a respective first link 161, e.g., a radio link or a wired link. The first node 101 may communicate with the first network node 111 over a second link 162, e.g., a radio link or a wired link. The first node 101 may communicate with the second network node 112 a third link 163, e.g., a radio link or a wired link. The first network node 111 may communicate with the device 130 over a fourth link 164, e.g., a radio link. Any of the respective first link 161, the second link 162 and the third link 163 may be a direct link or it may go via one or more computer systems or one or more core networks in the communications system 100, or it may go via an optional intermediate network. The intermediate network may be one of, or a combination of more than one of, a public, private or hosted network; the intermediate network, if any, may be a backbone network or the Internet, which is not shown in FIG. 2.

Any of the respective first link 161, the second link 162 and the third link 163 may be a direct link or comprise one or more links.

In general, the usage of "first", "second", "third" and/or "fourth" herein may be understood to be an arbitrary way to denote different elements or entities, and may be understood to not confer a cumulative or chronological character to the nouns they modify.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

Figure 3:
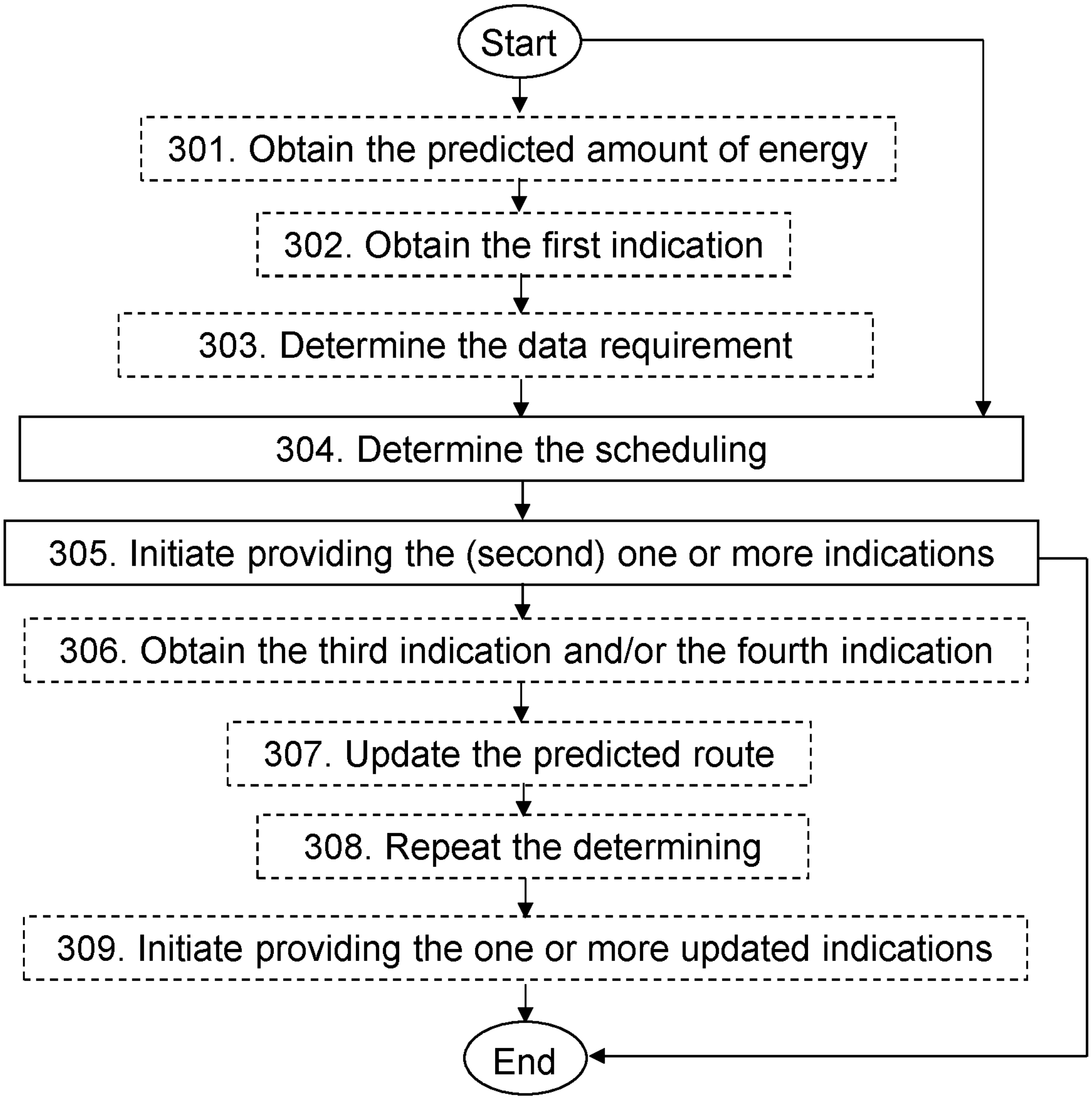
FIG. 3 depicts a flowchart of a method in a first node, according to embodiments herein.

Embodiments of a method, performed by the first node 101, will now be described with reference to the flowchart depicted in FIG. 3. The method may be understood to be for managing one or more indications. The first node 101 operates in the communications system 100.

Several embodiments are comprised herein. In some embodiments all the actions may be performed. In other embodiments, two or more actions may be performed. One or more embodiments may be combined, where applicable. All possible combinations are not described to simplify the description. It should be noted that the examples herein are not mutually exclusive. Components from one embodiment may be tacitly assumed to be present in another embodiment and it will be obvious to a person skilled in the art how those components may be used in the other exemplary embodiments. A non-limiting example of the method performed by the first node 101 is depicted in FIG. 3. In FIG. 3, actions which may be optional in some examples are depicted with dashed boxes.

Action 301

In the course of operations of the communications system 100, the device 130 may move along a path. Based on historical data, the first node 101, e.g., via an Artificial Intelligence (AI) based algorithm may predict the possible movements of the device 130 in next n-steps, that is, the first node 101 may predict the predicted route 140 of the device 130. The historical data may comprise past data on previous: type of device, typical applications running on the device, application QoE requirements, application energy saving settings, mobility pattern of UEs, number of devices at a location historically, energy usage of the base stations, weather predictions vs actual etc.

The device 130 may move along the predicted route 140, which may be a road. Along the predicted route 140, a data transfer may need to be performed to or from the device 130.

In order to eventually maximize usage of renewable sources of energy for the transfer of data, the first node 101 may first assess whether or not the plurality of cells 121, 122 providing radio coverage to the predicted route 140 of the device 130 use, respectively, renewable energy, partially or entirely. Before taking any decision on scheduling the data transfer, the first node 101 may then consider if any of the cells in the plurality of cells 121, 122 providing radio coverage to the predicted route 140 which may use partially or entirely renewable energy, may have a sufficient amount of energy to handle the data transfer, at least in part.

With this aim, in this Action 301, the first node 101 may obtain, autonomously or from the second node 102 operating in the communications system 100, a predicted amount of energy available at the second network node 112 serving the second cell 122.

Obtaining may be understood as receiving or acquiring, e.g., via the first link 161.

The obtaining of the predicted amount of energy, either by the first node 101 or by the second node 102, may comprise using as inputs: a) battery capacity, b) current energy available in battery, c) expected energy for renewable source for next n hours based on a weather prediction, d) expected traffic pattern of the device 130 and the other devices 131 for next n hours, e) an expected average data requirement for the device 130 and the other devices 131, and f) a minimum energy per hour required for keeping the base station running, and then predicting the expected energy and expected data requirement at the second network node 112. The output may be the energy available per hour for the next n hours. Each green cell may have these predicted values and may use them for optimizing the usage of green energy.

Whichever of the first node 101 or the second node 102 may autonomously obtain the predicted amount of energy, may be referred to herein as an energy predictor.

In a first group of embodiments, the first node 101 may perform Action 301 making no assumptions about the traffic pattern. The aim in the first group of embodiments may be to obtain the predicted green energy production for a future time window given the expected weather. The inputs may be weather conditions (W), including, as an example for solar power, daylight period, that is, all external information. It may be understood that for other types of energy, other information may be input. The output may be a number (P) indicating an amount of power expected to be available over the time period, for e.g., 1 hour. Typically, the output may be provided in small ranges that may be indicated, e.g., by indices 0,1,2,3 indicating different power ranges, for example, indicating 0-1000, 1001-2000, 2001-3000, 3001+ watts over the time period. In this first group of embodiments, the first node 101 may obtain the predicted amount of energy by, in a training phase, training a neural network with the input, and using simple backpropagation to update the weights. In a subsequent inferencing phase, right environment data for the location of the base stations, e.g., any of the first network node 111 and the second network node 112, may be provided, and the first node 101 may then output the prediction. The first node 101 may then first, (A) add an available battery capacity to the above production prediction, and second, (R) remove expected power consumption by the device 130 and the other devices 131, based on historical timeseries data. The first node 101 may then obtain the net available power for the next time window as=P+A−R.

In a first group of embodiments, the first node 101 may perform Action 301 considering the traffic pattern and location information along with weather information. The aim in the second group of embodiments may be to obtain the predicted green energy production for a future time window given the expected weather. The inputs may be weather conditions (W), including, as an example for solar power, daylight period, that is, all external information, location of the base station and energy sources, expected number of UEs over the time period and related traffic patterns. The output may be a number (P) indicating an amount of power expected to be available over the time period, for e.g., 1 hour. Typically, the output may be provided in some small ranges that may be indicated, e.g., indicated by indices 0,1,2,3 indicating different power ranges for example, Indicating 0-1000, 1001-2000, 2001-3000, 3001+ watts over the time period. In this second group of embodiments, the first node 101 may obtain the predicted amount of energy by, in a training phase, by training a neural net with the input and using simple backpropagation to update the weights. In a subsequent inferencing phase, right environment data for the location may be provided, and the first node 101 may then output the prediction. The first node 101 may then able to evaluate the amount of energy for the given horizon, given the estimated energy production, traffic patterns and energy consumption rates.

The above-mentioned neural network architecture may be replaced by other models such as regression, reinforcement learning and so on as well.

By obtaining the predicted amount of energy available at the second network node 112 in this Action 301, the first node 101 may then be enabled to determine if the second network node 112 may be enabled to manage the data transfer, and to what degree. The first node 101 may thereby be enabled to optimize the data transfer to preferentially use renewable energy.

Action 302

In some embodiments, in this Action 302, the first node 101 may obtain a first indication received from the device 130 indicating one or more preferences for the data transfer.

The obtaining, e.g., receiving, in this Action 302 may be performed, e.g., via the second link 162 and the fourth link 164.

In accordance with this Action 302, at the Operative System (OS) level, the device 130 may choose the kinds of applications that may need to work in the energy efficiency mode. There may be fallbacks in place, wherein if there are unavoidable events, such as stringently meeting the QoE of video streams or maintaining the throughput of a gaming application, the quality or the energy efficiency modes may be relaxed.

By, in this Action 302, obtaining the first indication, the first node 101 may be enabled to then take the preferences for the data transfer into consideration when optimizing the data transfer to preferentially use renewable energy.

Action 303

In this Action 303, the first node 101 may determine, using machine learning, a data requirement for the transfer along the predicted route 140. The determining in this Action 303 of the data requirement may be based on at least one or more of the following.

According to a first option, the determining in this Action 303 of the data requirement may be based on historical data, which may be referred to herein as third historical, on data requirements for the device 130, other devices, or both.

According to a second option, the determining in this Action 303 of the data requirement may be based on respective location and respective type of the plurality of cells 121, 122 along the predicted route 140, with respect to usage of renewable energy. That is, the determining in this Action 303 may be based on location data of the first network node 111 and the second network node 112, that is the base stations serving the plurality of cells 121, 122.

According to a third option, the determining in this Action 303 of the data requirement may be based on an expected next cell 153 for the device 130 along the predicted route 140.

According to a fourth option, the determining in this Action 303 of the data requirement may be based on an expected data requirement for the device 130 during the time period.

According to a fifth option, the determining in this Action 303 of the data requirement may be based on whether or not a category of the data to be transferred is cacheable data or delayable data.

Determining may be understood as calculating, choosing, selecting, etc.

Action 303 may be performed by a component of the first node 101 which may be referred to herein as a data requirement predictor. This component may predict the data requirement for each device, e.g., which may be entering the grid, and the expected time when it may need various data. A priority of the devices may be considered if there is a conflict.

By determining the data requirement in this Action 303, the first node 101 may be enabled to then determine the scheduling of the data transfer as described in the next Action 304.

Action 304

The first node 101 may collect data, that is information that may be required to determine a scheduling of the data transfer. Such data may comprise, but may be understood to not be limited to: a) location data of the device 130, b) location data of the base stations, such as the first network node 111 and the second network node 112, energy tag or energy rating of the base stations, that is, of the first network node 111 and the second network node 112, d) signal strength, e.g., current signal strength, of the base station, e.g., any of the first network node 111 and the second network node 112, at various locations based on past information from other UEs such as the other devices 131, e.g., a heatmap, e) UE mobility traffic that may be being generated, e.g., movement of the device 130 and possible locations of the other devices 131 in next n steps, g) number of the other devices 131 in the vicinity, h) past data of the network transactions and movement of UEs such as the other devices 131, i) past energy usage of the base stations, such as the first network node 111 and the second network node 112, and j) weather predictions. The first node 101 may perform the collection of data via a component that may be referred to herein as a data collector.

The first node 101, based on the collected information may then aim to control the priority of the data for any data download or upload for optimal usage of green energy, without compromising the QoE.

In this Action 304, the first node 101 determines a scheduling of a transfer of data to or from the device 130 along the predicted route 140 to be followed by the device 130 during a time period. The determining in this Action 304 may be further based on a type of energy used by the plurality of cells 121, 122 providing radio coverage along the predicted route 140.

Action 304 may be performed by a data prioritizer component in the first node 101, which, based on the prediction of the data requirement, may prioritize the data into various buckets such as mandatory, schedule for later, collect data in advance etc. This component may sit in both cloud 105 and the device 130, and may manage the priorities in both places. UEs priority may be considered if there is a conflict.

In some embodiments, the determining of the scheduling in this Action 304 may comprise determining whether the transfer of data is to be initiated at the first cell 121 comprised in the plurality of cells 121, 122, or delayed until the device 130 reaches the second cell 122 comprised in the plurality of cells 121, 122, based on the predicted route 140 to be followed by the device 130 during the time period. In such embodiments, the determining in this Action 304 of the scheduling may be further based on at least one or more of: a) whether or not the first cell 121 uses renewable energy, partially or entirely, b) whether or not the second cell 122 uses renewable energy, partially or entirely, c) a first location of the device 130 with respect to a second location of the second cell 122, d) a data requirement for the transfer along the predicted route 140, and e) a predicted amount of energy available at a second network node 112 serving the second cell 122, based on the predicted route 140. In other words, under option a) and option b), the first node 101 may base the determining in this Action 304 based on an energy tag of the base station. Under option c), the first node 101 may base the determining in this Action 304 based on the location of base stations such as the first network node 111 and the second network node 112.

The predicted amount of energy under option e) may be that obtained in Action 301. Any of the first location of the device 130 with respect to the second location of the second cell 122, and the data requirement for the transfer along the predicted route 140 may be based on the UE mobility traffic that may be being generated.

In some embodiments, the determining in this Action 304 of the scheduling may be further based on at least one or more of: a) a predicted signal strength of the first cell 121 and the second cell 122 during the time period, b) a number of other wireless devices 131 in a vicinity of the first cell 121 and the second cell 122 during the time period, the number being one of predicted, observed or both, c) first historical data on data transfers at the first cell 121 and the second cell 122, d) second historical data on energy usage by a first network node 111 serving the first cell 121 and the second network node 112 serving the second cell 122, and e) predicted weather during the time period at a respective location of the first network node 111 and the second network node 112.

The predicted signal strength of the first cell 121 and the second cell 122 during the time period may be based on data on the current signal strength, collected by the first node 101.

In some embodiments, the determining of the scheduling in this Action 304 may be further based on at least one or more of: a) a priority of the transfer of data, and b) whether or not the data to be transferred may be cacheable or delayable.

In embodiments wherein Action 303 may have been performed, the determining of the scheduling in this Action 304 may be further based on the obtained first indication.

The determining in this Action 304 of the scheduling may be performed using machine learning. The first node 101 may, in such embodiments, train a Reinforcement Learning (RL) predictive model, using standard techniques. The inputs may comprise: the data requirement of the wireless device 130, location information with the type of cells, e.g., of the first cell 121 and the second cell 122, mobility prediction information, that is, the mobility profile of the device 130, and the connected cell details as well as the expected next cell 153, historical data about the category of different data, in other words, user/application expectation on future data requirements, and a data index which may give the priority of the data. The first node 101 may then output the scheduling of the transfer of data based on the category of data, e.g., whether the data may be cacheable data, delayable data or whether the device 130 may need to continue with the data transfer. During the training phase, a reward structure may be linked to the QoE. During the inference phase, RL policy may decide what may be the appropriate action based on the category of the data. This may also be performed by temporal planning, e.g., as an alternate to RL.

Action 304 may be performed by another component of the first node 101 that may be referred to herein as a data prioritizer.

EXAMPLES

The following mobile applications may be flexible in terms of scheduling the related data transfer.

Video streaming: The first node 101 may determine to increase the cache storage based on the potential availability of green and red base stations, or outage or low strength network coverage to get a seamless experience. If the streaming file is of short duration, the first node 101 may suggest or automatically download the next recommended file as per the suggestion by the application, or warn the device 130 about a potential outage.

Navigation: During a navigation, the traffic conditions, traffic update, possible alternate paths, details about the facilities on the way, battery recharging etc. may be updated to near real time information based on the potential availability of green and red base stations or if there is a possibility of network outage. This may be possible even if the navigation application is not currently in use, but there may be an intention by a user of the device 130 to use as per the historical information.

Installation of applications: Based on the possible base station availability or network condition, downloading the installation of various applications may be either delay or may start earlier. This may be based on the priority and usage pattern of the application.

General browsing and news: A cache of frequent websites may be downloaded as refreshed to make them available offline based on the expected network strength or type of base stations.

Further examples suggesting normal operations, including robustness and fallback mechanisms may be as follows.

A mechanism providing robustness, that is, QoS Trade-off may be that in case of QoS critical applications such as music streaming, and/or video calls, the first node 101 may determine to cache maximally in case the next cell is red. It may also be possible to switch to an “energy inefficient” mode even though the device 130 may move towards the red cell.

Example 1: Video/music streaming: In the scenario that the device 130 may be moving from a green cell to a red cell, then the application may be encouraged to increase its buffering so as to limit the usage during the travel through the red cell. Alternately, in the scenario of moving from a red cell to a green cell, the device 130 may be encouraged to delay a download so that it limits the usage in the red cell and makes use of the opportunity in the green cell, thereby resulting in green behavior.

Example-2: Video call/real-time gaming: In this case, although it may seem that a strategy similar to example-1 may be employed to provide hints to the application, the first node 101 may compute the impact to the QoS for the service. The impact to a real-time activity may be understood to be more significant, in terms of delays being less tolerable. Hence, in this case, the first node 101 may not provide the buffering/delaying hints that it may otherwise. Thus, the method may be understood to be robust and sensitive to the QoS of an application.

By determining the scheduling of the transfer of data to or from the device 130 along the predicted route 140 based on the type of energy used by the plurality of cells 121, 122, data transmission to or from the device 130 and the other devices 131 may be optimized and the green energy usage may be maximized. The determining in this Action 304 may also enable that the base stations and the device 130 and the other devices 131 may perform efficient budgeting of energy and QoS of to improve the carbon footprint.

Action 305

In this Action 305, the first node 101 initiates providing one or more indications to the device 130 based on a first result of the determining of the scheduling from Action 304.

Initiating may be understood as triggering, enabling, facilitating or starting.

The providing, e.g., sending or transmitting, may be performed, e.g., via the second link 162, and the fourth link 164. Otherwise, the first node 101 may facilitate that another node performs the providing to the device 130.

That is, based on historical data, the first node 101 may predict the possible movements of the device 130 in next n-steps and the expected data requirement of the device 130 during next n steps. Using this information, the first node 101 may then provide information to the device 130. In some embodiments, the one or more indications may indicate at least one or more of: a) the data requirement for the transfer along the predicted route 140, that is, the data required for the device 130, b) the plurality of cells 121, 122 along the predicted route 140, that is, the possible red and green cells in the vicinity, c) whether or not the plurality of cells 121, 122 use, respectively, renewable energy, partially or entirely, e.g., energy availability of the green cells, d) respective signal strength of the plurality of cells 121, 122, that is, possible signal strength in the predicted route 140 the first node 101 may be predicting, e) respective predicted amount of energy available at the respective network nodes 110 respectively serving the plurality of cells 121, 122, f) the predicted amount of energy available at the second network node 112 and a predicted amount of energy available at a first network node 111 serving the first cell 121, g) a timeline of the transfer of data along the route, wherein the timeline is one of: i) an instruction to be applied by the device 130, and ii) a recommendation overwritable by the device 130, h) a potential downtime of the device 130 based on the timeline, and i) a predicted impact on a Quality of Experience based on the timeline.

In the timeline, the first node 101 may suggest to either download the required data in advance based on the green cell availability, data priority or delay some low priority downloads until the device 130 crosses the red cell zone or low strength zone. In this way, the data requirement during red cell zone and the low strength zone may be minimized. Based on the information on the availability of green cells and connection strength, the first node 101 may also inform the device 130 about potential downtime and suggest an alternative.

Scheduling Examples

Example 1: A first non-limiting example of the one or more indications may be as follows, for a renewable energy base station scenario. The first number to the left of each line indicates a time stamp of the time period. “D:” indicates time duration for the action, “C:” indicates cost of the action, and 80% indicates that Base station 1 has a renewable energy charge of 80%:

0.0000: (Car1 Requests Video Transfer) [D:10.00; C:0.10]

110.0000: (Schedule High Definition (HD) Video Transfer Base station 1

Renewable Energy 80%) [D:10.00; C:0.10]

120.0000: (Track Car1 Movement) [D:10.00; C:0.10]

130.0000: (Complete HD Video Transfer Base station 1) [D:10.00; C:0.10]

140.0000: (Car Charging Station Idle) [D:10.00; C:0.10]

Example 2: A second non-limiting example of the one or more indications may be as follows, for a grid connected base station scenario. The first number to the left of each line indicates a time stamp of the time period:

0.0000: (Car1 Requests Video Transfer Battery 30%) [D:10.00; C:0.10]

110.0000: (Schedule Standard Definition (SD) Video Transfer Base station 2 Grid Connected) [D:10.00; C:0.10]

120.0000: (Schedule SD Video Transfer Base station 1) [D:10.00; C:0.10]

130.0000: (Track Car1 Movement) [D:10.00; C:0.10]

After moving from this area, transform to HD video 140.0000: (Schedule HD Video Transfer Base station 1 Renewable Energy) [D:10.00; C:0.10]

In embodiments wherein Action 303 may have been performed, the one or more indications may be one or more second indications.

In some embodiments, the one or more indications may further indicate a reward for the device 130 with the proviso the device 130 follows a recommended timeline for the data transfer. This may be understood as a reward system comprised in or connected to the first node 101. The reward system may be understood to have two functionalities. A first functionality may be understood to be to provide hints for an application that may be running on the device 130 to adopt a green behavior, for example encouraging handover to a green cell, doing more download in a green cell if it is a video viewing so that when the device 130 may enter the green cell it does much data transfer, etc. Based on the information on the availability of green cells and connection strength, the first node 101 may also inform the device 130 about potential downtime and suggest an alternative. While a green decision or a hint may be made, the decision may affect the QoE. An estimate of the impact of the QoE may be made. This impact may be factored in before the final hand over decision, or a hint to cache/delay a download may be made.

A second functionality may be understood to be to provide incentives. Based on the usage of the data over green and red cells, the first node 101 may provide appropriate rewards to encourage the device 130 to use the energy from green cells to the maximum. Whenever the device 130 may be connected to a red cell, the rewarding system may give negative points. When the device 130 may be connected to a green cell, the system may provide positive points. If, for example, minimum data transmitted between the device 130 and a red base station, the device 130 may get more positive points. For example, an operator of the communications system 100 may fix various cashback whenever the green cell is utilized for data transfer or provide carbon footprint points which may be redeemed.

By initiating providing the one or more indications to the device 130 in this Action 305, the first node 101 may enable that the device 130 optimizes the transfer of data, while maximizing the use of green energy. As a further advantage, the first node 101 may enable energy and QoS efficient budgeting of base stations and devices to improve the carbon footprint.

Action 306

Once the prediction and data prioritization may have been performed, the first node 101 may crosscheck it with the actual path that the device 130 may choose, and the actual requirement of data the device 130 may have, and the first node 101 may update the prediction on a continuous basis, as well as provide corrections to ensure a QoE. This cross-check may be performed by a Monitor component comprised in, or connected to, the first node 101.

According to the foregoing, in some embodiments wherein the one or more indications may be one or more second indications, the first node 101 may, in this Action 306 obtain at least one of: i) a third indication indicating the device 130 may have deviated from the predicted route 140 during the time period, and ii) a fourth indication indicating the device 130 may have overwritten a recommended timeline of the transfer of data along the predicted route 140 indicated by the one or more second indications.

The obtaining may be performed, e.g., via the second link 162, and the fourth link 164.

By obtaining the third indication and/or the fourth indication in this Action 306, the first node 101 may be enabled to dynamically adapt to any changes of route and/or any instructions from the device 130.

Action 307

In this Action 307, the first node 101 may update the predicted route 140 to be followed by the device 130 during the time period.

By updating the predicted route 140 in this Action 307, the first node 101 may dynamically adapt to any changes of route and/or any instructions from the device 130.

Action 308

The device 130 may override the predicted route 140, the first node 101 may recalculate the requirements. The fallback mechanism using monitor may ensure this. When the first node 101 may have predicted a certain movement path, that is, the predicted route 140, but may detect that there is a significant deviation in reality, the first node 101 may then modify the hint decisions earlier and instead send new decisions, consistent with the new path. In this Action 308, the first node 101 may repeat the determining of the scheduling in Action 304 based on the obtained at least one of the third indication and the fourth indication.

In embodiments wherein Action 307 may have been performed, the repeating in this Action 308 of the determining of the scheduling of Action 304 may be based on the updated predicted route 140.

A mechanism providing fallback, in case the estimates may be erroneous, the behavior of the device 130 may be changed. Either the device 130 may be re-directed towards the green cells or accept deteriorated service levels.

Example

Taking Example-1 of Action 304 as a start point, where the device 130 may have been predicted to move from a red cell to a green cell, and the application may have been hinted to delay a download as part of green behavior, if the device 130 did not follow the predicted route 140 and instead stayed in the red cell. In this case, the first node 101 may re-evaluate its hint and suggest to the device 130 that it may continue now to download, even though it is in the red cell. Thus, the method has a fallback mechanism when the movement is not on the predicted lines.

By the first node 101 repeating the determining in this Action 308, the first node 101 may enable to be adaptive to changes in the behavior of the device 130.

Action 309

In this Action 309, the first node 101 may initiate providing one or more updated indications to the device 130 based on a result of the repeated determination.

The providing, e.g., sending or transmitting, may be performed, e.g., via the second link 162, and the fourth link 164.

By initiating providing the one or more updated indications to the device 130 in this Action 309, the first node 101 may enable that the device 130 may continuously assess if it may follow the scheduling determined by the first node 101, or if it may decide to overwrite it, hence providing flexibility to the communications system 100.

Figure 4:
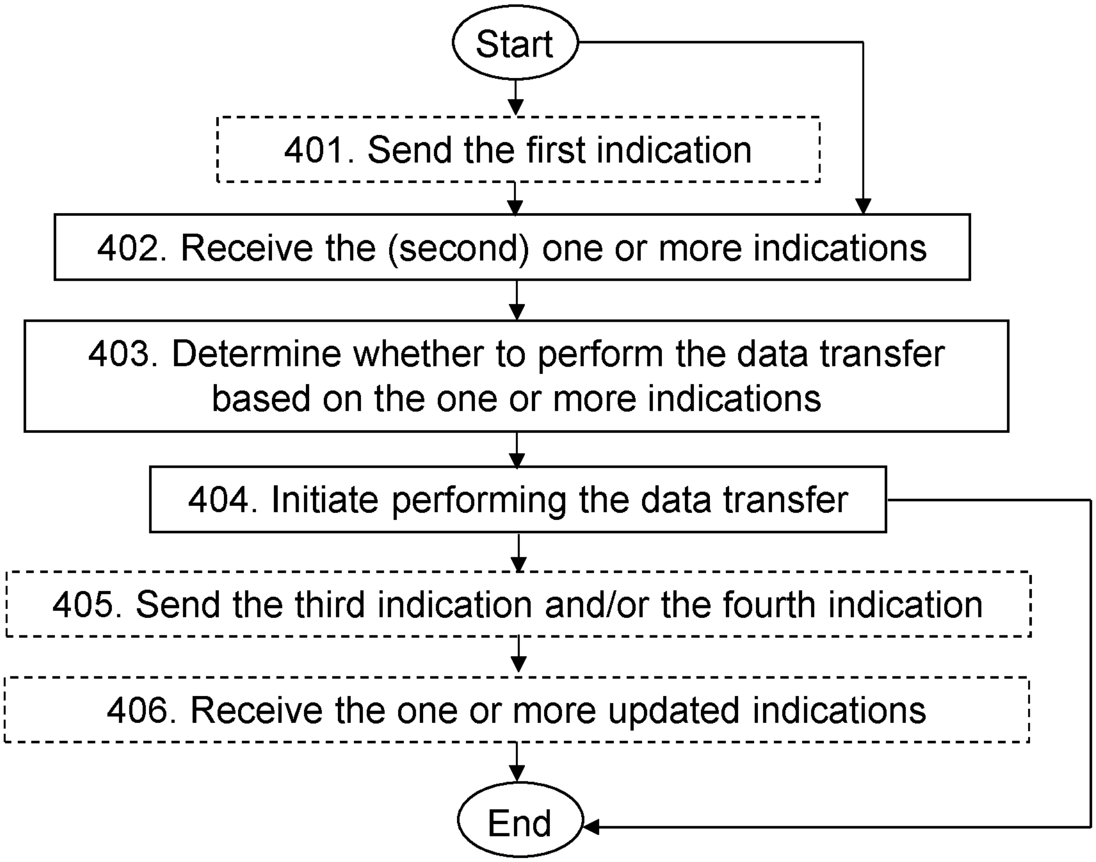
FIG. 4 depicts a flowchart of a method in a device, according to embodiments herein.

Embodiments of a method, performed by the device 130, will now be described with reference to the flowchart depicted in FIG. 4. The method may be understood to be for managing the one or more indications.

The device 130 operates in the communications system 100.

Several embodiments are comprised herein. In some embodiments all the actions may be performed. In other embodiments, some actions may be performed. One or more embodiments may be combined, where applicable. All possible combinations are not described to simplify the description. It should be noted that the examples herein are not mutually exclusive. Components from one embodiment may be tacitly assumed to be present in another embodiment and it will be obvious to a person skilled in the art how those components may be used in the other exemplary embodiments. A non-limiting example of the method performed by the device 130 is depicted in FIG. 4. In FIG. 4, actions which may be optional in some examples are depicted with dashed boxes. The detailed description of some of the following corresponds to the same references provided above, in relation to the actions described for the first node 101 and will thus not be repeated here to simplify the description. For example, if minimum data is transmitted between the device 130 and a red base station, the device 130 may get more positive points.

Action 401

In this Action 401, the device 130 may send to the first node 101, the first indication indicating the one or more preferences for the data transfer.

The sending may be performed, e.g., via the second link 162, and the fourth link 164.

The device 130 may have its one or more preferences set in a UE Energy Efficient Setting. The one or more preferences may then be sent to the first node 101 in this Action 401 via one or more Application Programming Interfaces (API) calls. API calls may be included within an application that may be able to identify the types of base stations connected for the data transfer. The retrieved base station type may then be used to change the data rate, data quality, caching rates etc.

API Call Examples

Example 1: A first non-limiting example of an API call may be as follows, from green base station:

```
{
  "data": {
    "id": 2,
    "base station ID": BS192829",
    "base station energy level": "Available",
    "base_station type": "Green",
    "available zone": "[A, B]"
  },
  "support": {
    "data rate": "High",
    "data quality": "High"
    "caching level": "Aggressive"
  }
}
```

Example 2: A first non-limiting example of the one or more indications may be as follows, for a red base station:

```
{
  "data": {
    "id": 2,
    "base station ID": BS134529",
    "base station energy level": "Available",
    "base_station type": "Red",
    "available zone": "[C, D]"
  },
    "support": {
    "data rate": "Low",
    "data quality": "Low"
    "caching level": "Minimal"
  }
}
```

Action 402

In this Action 402, the device 130 receives, from the first node 101 operating in the communications system 100, the one or more indications. The one or more indications indicate the scheduling of the transfer of data to or from the device 130 along the predicted route 140 to be followed by the device 130 during the time period. The one or more indications is further based on the type of energy used by the plurality of cells 121, 122 providing radio coverage along the predicted route 140.

In some embodiments, the one or more indications may further indicate whether the transfer of data is to be initiated at the first cell 121 comprised in the plurality of cells 121, 122, or delayed until the device 130 reaches the second cell 122 comprised in the plurality of cells 121, 122, based on the predicted route 140 to be followed by the device 130 during the time period. In such embodiments, the one or more indications may be further based on at least one or more of: a) whether or not the first cell 121 uses renewable energy, partially or entirely, b) whether or not the second cell 122 uses renewable energy, partially or entirely, c) the first location of the device 130 with respect to the second location of the second cell 122, d) the data requirement for the transfer along the predicted route 140, and e) the predicted amount of energy available at the second network node 112 serving the second cell 122, based on the predicted route 140.

In some embodiments, the one or more indications may be further based on at least one or more or more of: a) the predicted signal strength of the first cell 121 and the second cell 122 during the time period, b) the number of other wireless devices 131 in the vicinity of the first cell 121 and the second cell 122 during the time period, the number being one of predicted, observed or both, c) the first historical data on data transfers at the first cell 121 and the second cell 122, d) the second historical data on energy usage by a first network node 111 serving the first cell 121 and the second network node 112, and e) the predicted weather during the time period at the respective location of the first network node 111 and the second network node 112.

In some embodiments, the one or more indications may indicate at least one or more of: a) the data requirement for the transfer along the predicted route 140, b) the plurality of cells 121, 122 along the predicted route 140, c) whether or not the plurality of cells 121, 122 use, respectively, renewable energy, partially or entirely, d) respective signal strength of the plurality of cells 121, 122, e) respective predicted amount of energy available at the respective network nodes 110 respectively serving the plurality of cells 121, 122, f) the predicted amount of energy available at the second network node 112 and the predicted amount of energy available at the first network node 111 serving the first cell 121, g) the timeline of the transfer of data along the route, wherein the timeline is one of: i) the instruction to be applied by the device 130, and ii) the recommendation overwritable by the device 130, h) the potential downtime of the device 130 based on the timeline, and i) the predicted impact on the QoE based on the timeline.

In some embodiments, the one or more indications may be further based on at least one or more of: a) the priority of the transfer of data, and b) whether or not the data to be transferred may be cacheable or delayable.

In some embodiments, the one or more indications may be one or more second indications. In some of such embodiments, the received one or more indications may be further based on the sent first indication.

In some embodiments, the one or more indications may be further based on the data requirement for the transfer along the predicted route 140. The data requirement may be based on at least one or more of the following: i) the third historical data, on data requirements for the device 130, other devices, or both, ii) the respective location and the respective type of the plurality of cells 121, 122 along the predicted route 140, with respect to usage of renewable energy, iii) the expected next cell 153 for the device 130 along the predicted route 140, iv) the expected data requirement for the device 130 during the time period, v) whether or not the category of the data to be transferred is cacheable data or delayable data.

The one or more indications may further indicate the reward for the device 130 with the proviso the device 130 follows the recommended timeline for the data transfer.

Action 403

In this Action 403, the device 130 determines whether or not to perform the data transfer based on the received one or more indications.

By determining whether or not to perform the data transfer based on the received one or more indications in this Action 403, the device 130 may be enabled to flexibly decide whether or not to follow the recommendation of the first node 101, or whether to overwrite the recommendation, based on a change in the route, diverging from the predicted route 140, or due to another reason.

Action 404

In this Action 404, the device 130 initiates performing the data transfer according to a second result of the determining performed in 403.

By initiating performing the data transfer according to the second result of the determining from Action 403 in this Action 404, the device 130 may be enabled to flexibly diverge from the recommendation of the first node 101, based on a change in the route, diverging from the predicted route 140, or due to another reason.

Action 405

In some embodiments, wherein the one or more indications may be one or more second indications, the device 130 may, in this Action 405, send, to the first node 101, based on the second result of the determining 403, at least one or more of: i) the third indication indicating the device 130 has deviated from the predicted route 140 during the time period, and ii) the fourth indication indicating the device 130 has overwritten a recommended timeline of the transfer of data along the predicted route 140 indicated by the one or more second indications.

The sending may be performed, e.g., via the second link 162, and the fourth link 164.

Action 406

In some embodiments, wherein the one or more indications may be one or more second indications, the device 130 may, in this Action 406, receive one or more updated indications from the first node 101, based on the sent at least one of the third indication and the fourth indication.

The one or more updated indications may be based on an updated predicted route 140 to be followed by the device 130 during the time period.

Action 407

In this Action 407, the device 130 initiates performing the data transfer according to a second result of the determining 403.

Figure 5:
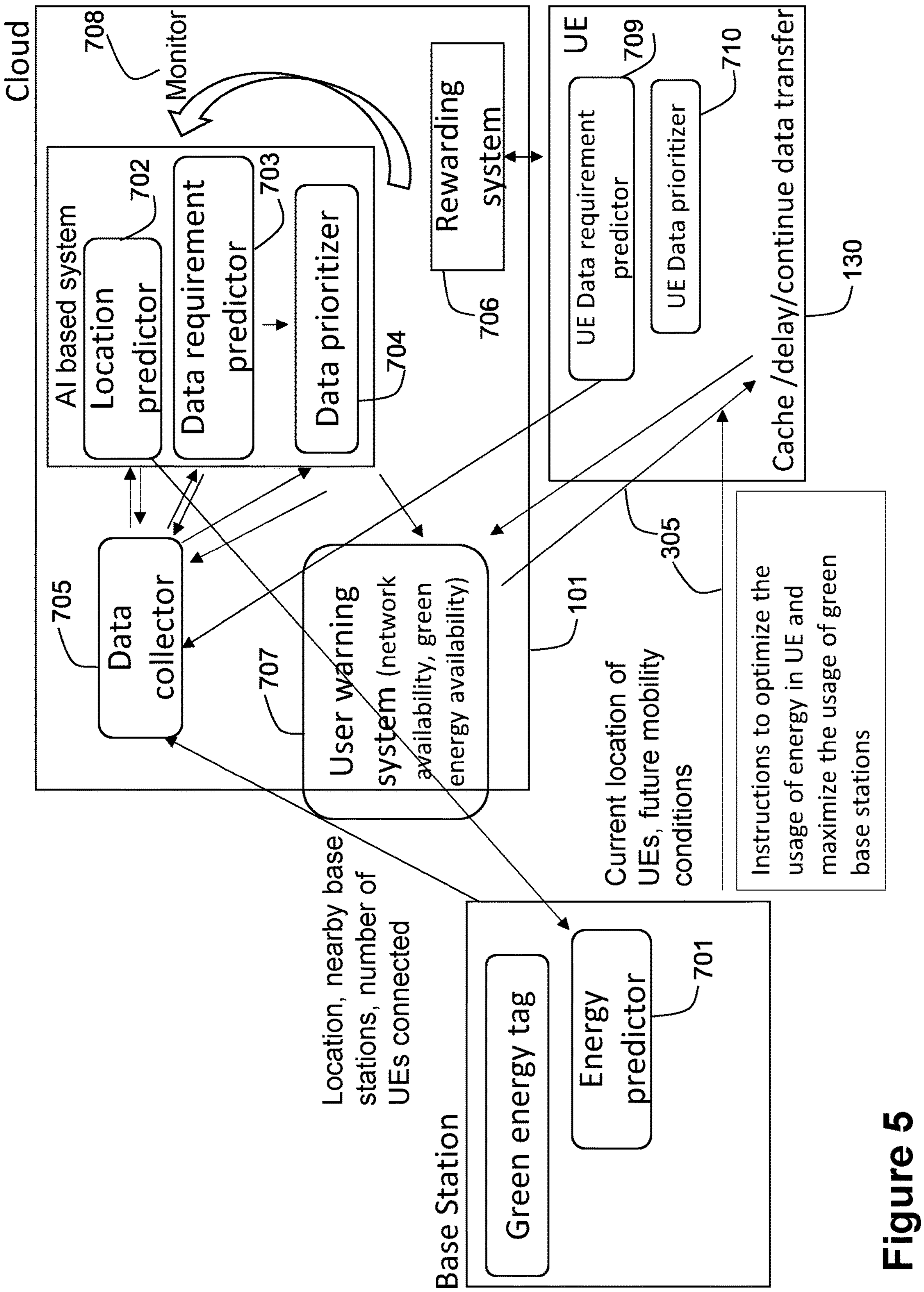
FIG. 5 is a schematic diagram illustrating a non-limiting example of inputs and outputs of components of a communications system, according to embodiments herein.
Figure 6:
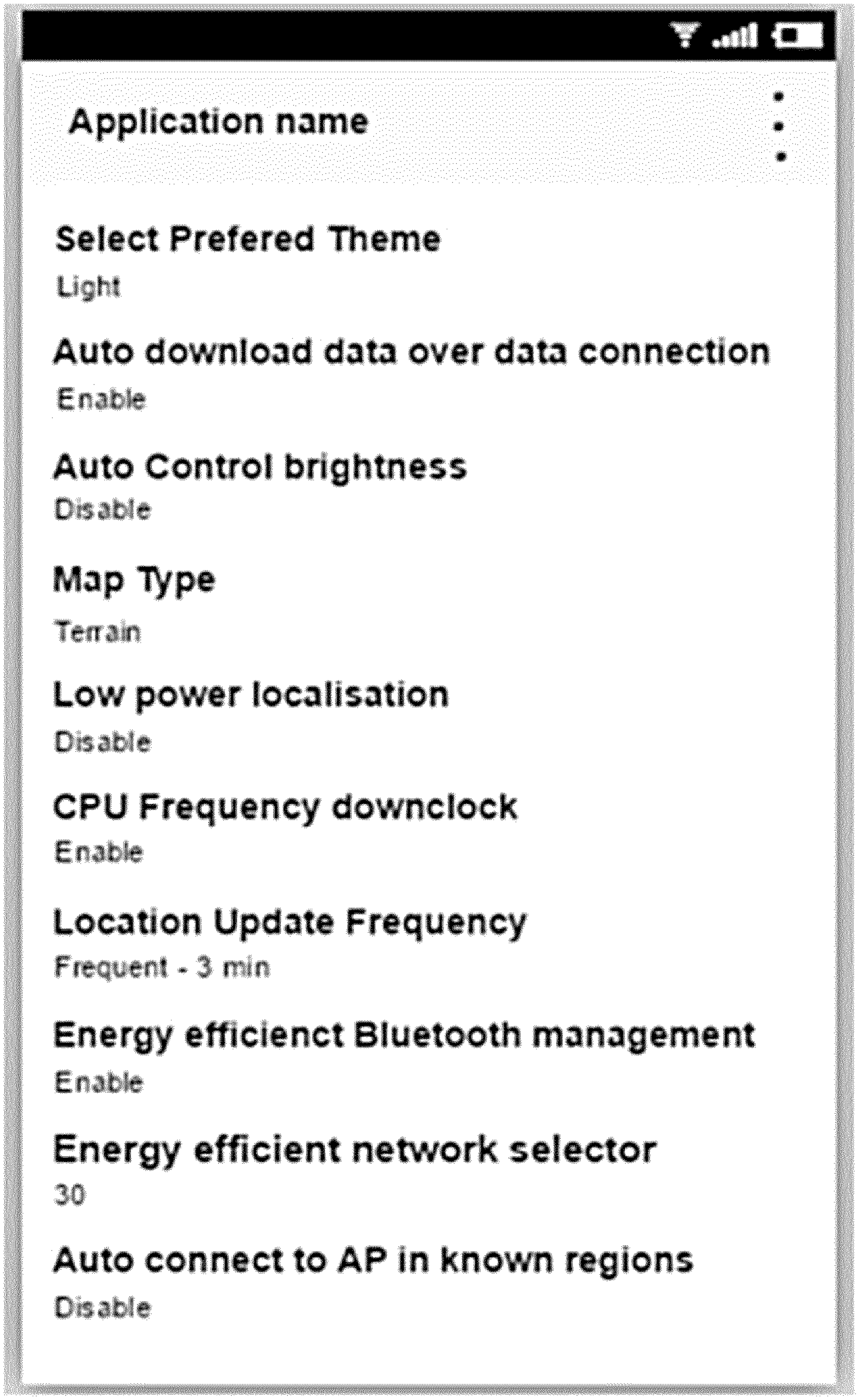
FIG. 6 is a schematic diagram illustrating an example of a an aspect of a device, according to embodiments herein.

FIG. 5 depicts a schematic diagram illustrating a non-limiting example of the components of the communications system 100, according to embodiments herein. FIG. 5 depicts the first node 101 as a distributed node comprising an energy predictor 701 in a base station and the first node 101 and a scheduler in the cloud which may use the energy and network information to increase the usage of green energy. The location predictor 702 may obtain information on the current location of UEs and future mobility conditions from the base station. The first node 101 may comprise an Artificial Intelligence (AI) based system comprising a location predictor 702, the data requirement predictor 702 and the data prioritizer 704, which may use AI to predict the data requirement and its priority, respectively, while considering green and red cells. The data collector 705 collects the information from the different components, such as location, nearby base stations, the number of UEs connected, and the green energy tag of the base stations, and may enable to provide a system which may use the prioritized and predicted data and provide a seamless experience to the user with usage of maximum green energy. The rewarding system 706 comprised in the first node 101 may reward the device 130 based on the usage of green energy. The first node 101 may also comprise a user warning system 707 which may warn the device 130 about the potential disturbances while moving, e.g., affecting network availability, green energy availability, and which may take inputs from the device 130 to provide better experience considering the usage of green energy. Also comprised in the first node 101 is the monitor 708, which may cross check, and update the predictions on a continuous basis. In accordance with Action 305, the first node 101 may provide, as one or more indications, instructions to optimize the usage of energy in the device 130 and maximize the usage of green base stations. The device 130, a UE in the example of FIG. 5, ma comprise a UE data requirement predictor 709, which may make predictions on the data requirements and provide them to the first node 191, and a UE data prioritizer 710, which may provide priority information to the data collector 705. The device 130 may provide information on the category of data it may need to transfer, e.g., whether the data may be cacheable data, delayable data or whether the device 130 may need to continue with the data transfer FIG. 6 is a screenshot illustrating a non-limiting example of how the device 130 may choose the kinds of applications that may need to work in the energy efficiency mode, at the OS level. As depicted in FIG. 6, for a certain application indicated by "Application name", the device 130 may enable or disable an auto download data over data connection, that is, the device 130/application may prioritize data transfer over choosing to be within the "green" policy. In addition, the device 130 may select a preferred theme for the Operative System (OS), here chosen as "light", enable or disable an auto control of the brightness, choose a map type as an example of an application specific input, selected here as "Terrain", enable or disable low power localisation for using localisation with less accurate settings traded off with lower power usage, enable or disable a CPU Frequency downclock to reduce CPU clock cycles on the device 130 to save power, set a location update frequency as a number of times the device 130 may need to synchronize with a base station/satellite to update its location, here chose as 3 min which is frequent, enable or disable an energy efficient Bluetooth management as an example of an energy efficient setting, choose an energy efficient network selector, here chosen at 30, to choose a network with a "green" tag, assuming the network displays energy efficiency rating, and enable or disable an auto connect to AP in known regions to disable access point connection may lead to superior energy efficiency, which here is disabled.

Figure 7:
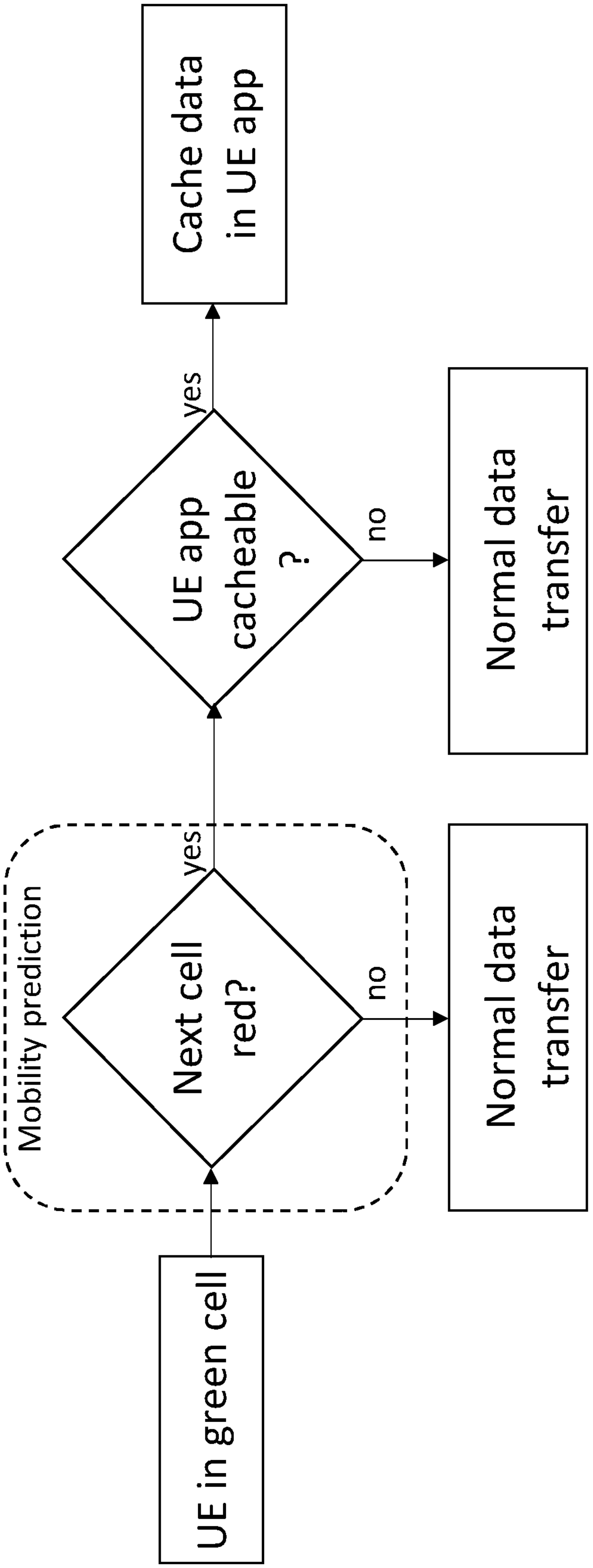
FIG. 7 is a schematic diagram illustrating an example of actions performed by a first node, according to embodiments herein.
Figure 8:
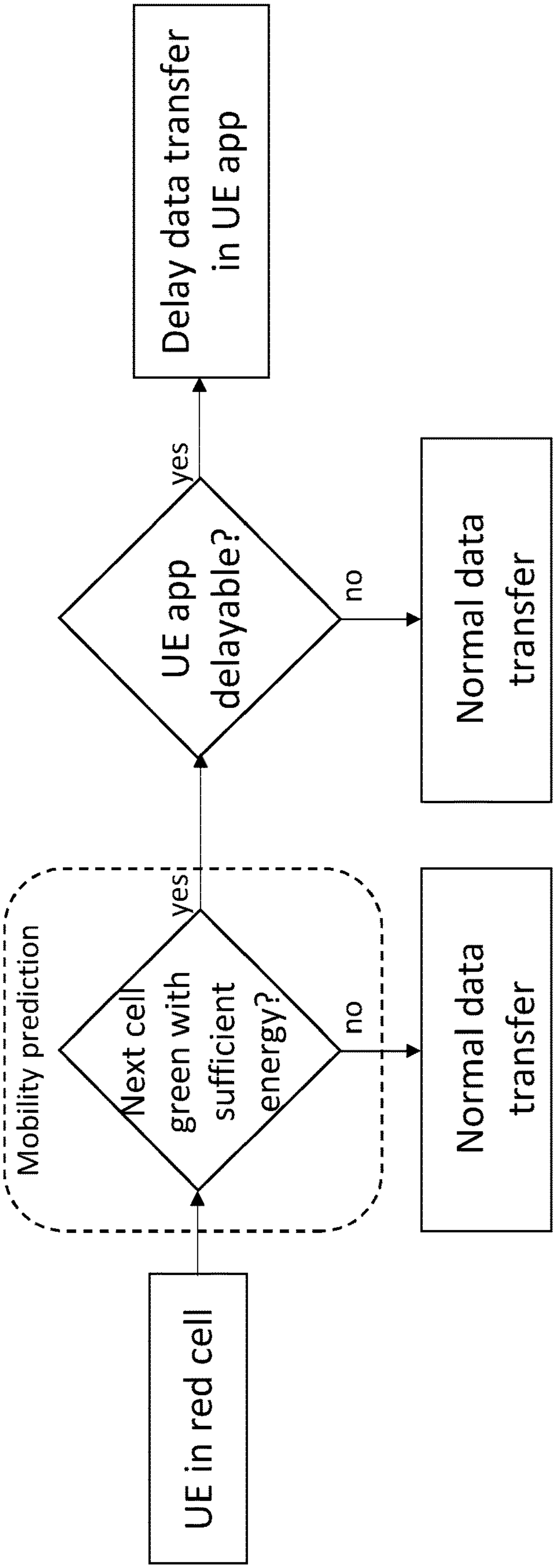
FIG. 8 is a schematic diagram illustrating another example of actions performed by a first node, according to embodiments herein.

FIG. 7 is a schematic diagram illustrating a non-limiting example of embodiments herein. In case of a moving device, two typical process flow scenarios are shown in FIG. 7 and FIG. 8. In a first scenario of FIG. 7, when the device 130 is in a green cell and the first node 101 may predict that it is to be handed over soon to a red cell, then the first node 101 may determine, in Action 304, to recommend that the application, provided it is able to cache data in the client, may download more data and cache it to use the resources of the green cell, and save more energy in the predicted red cell. If either the device 130 is not predicted to change from green to red, or the UE is not moving, or the UE application is not cacheable, the first node 101 may determine to recommend normal data transfer, indicating that the device 130 may transfer data as and when needed without any delay or buffering.

FIG. 8 is a schematic diagram illustrating another non-limiting example of embodiments herein. In case of a moving device, in a second scenario, when the device 130 is in a red cell and the first node 101 may predict that it is to be handed over soon to a green cell, then the first node 101 may determine, in Action 304, to recommend that the application, provided it is able to delay data transfer in the client, may delay data transfer to save energy in the red cell and utilize the resources in the predicted green cell. If either the device 130 is not predicted to change from red to green, or if the next cell is not a green cell with sufficient energy, or the UE is not moving, or if the UE application is not delayable, the first node 101 may determine to recommend normal data transfer, indicating that the device 130 may transfer data as and when needed without any delay or buffering.

Figure 9:
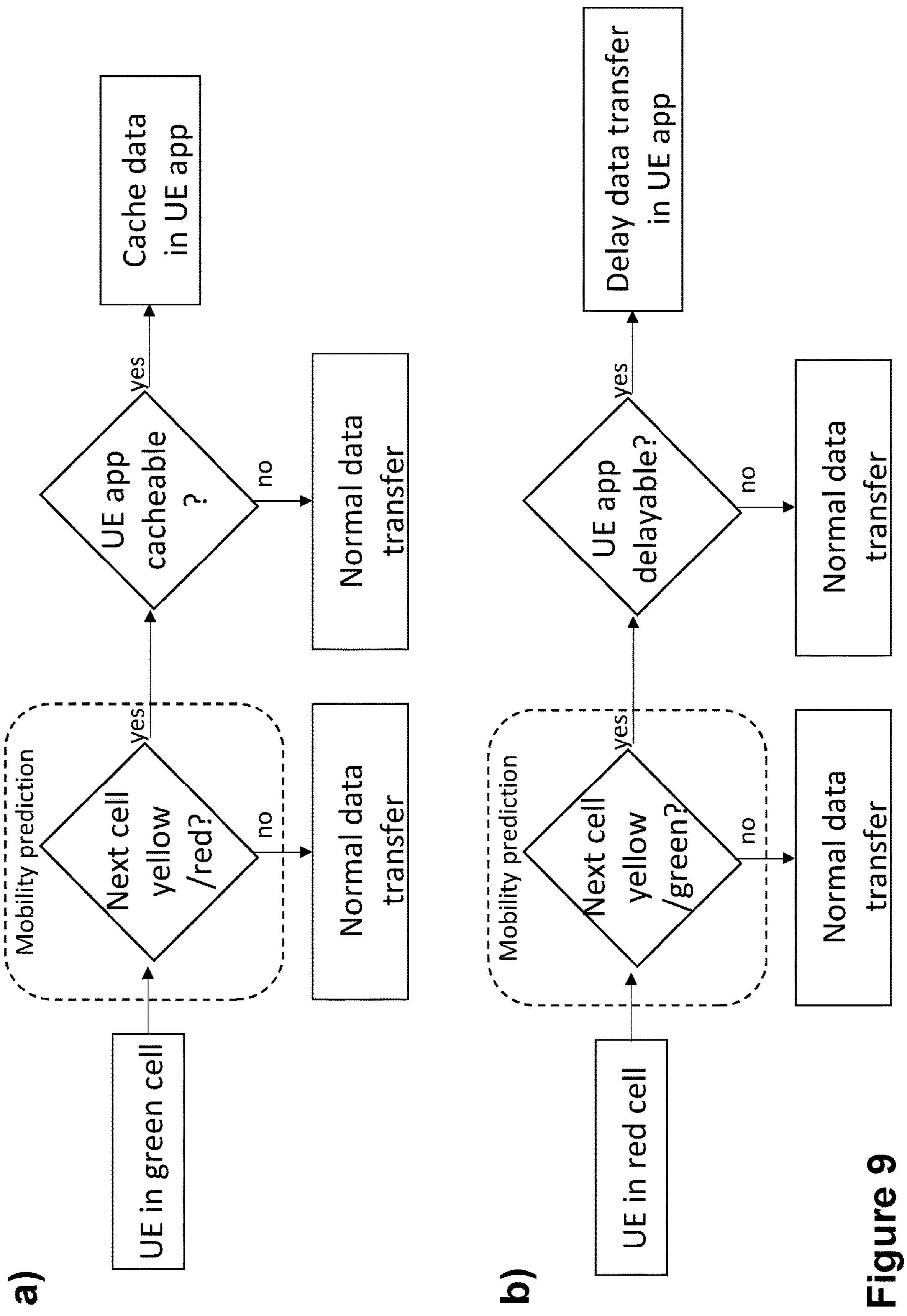
FIG. 9 is a schematic diagram illustrating a further example of actions performed by a first node, according to embodiments herein.
Figure 9:
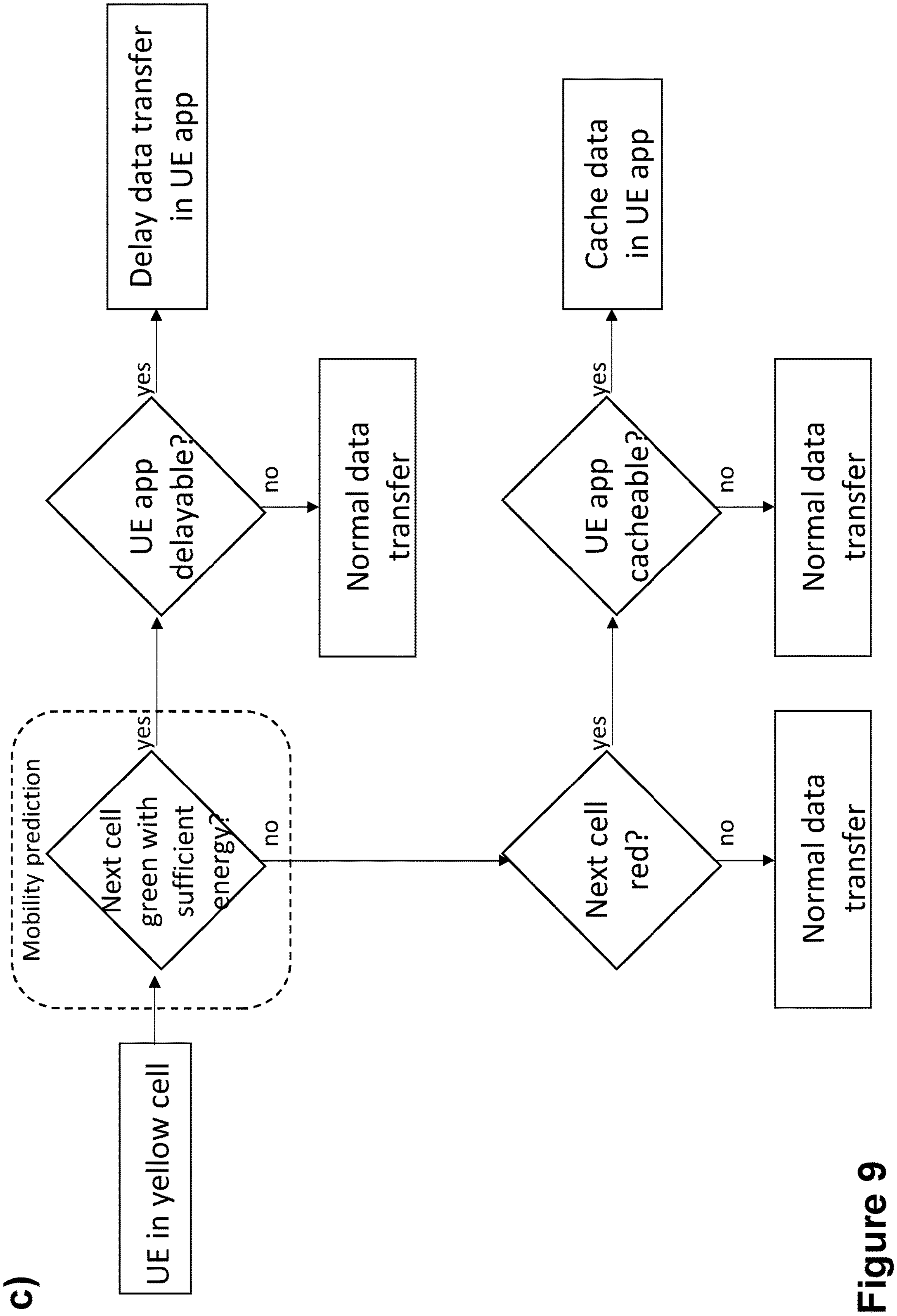

FIG. 9 is a schematic diagram illustrating three further non-limiting examples, in panel a), panel b) and panel c), of embodiments herein. There may be three types of cells: pure renewable cells may be called green cells, pure non-renewable cells may be called red cells. However, there may be another type of cells which may use both renewable and non-renewable energy source. These hybrid cells may be called yellow cells. In case more than one type of cells exists, the priority may be in the order of green, yellow, and then red. Panel a) corresponds to the first scenario of FIG. 7, and panel b) corresponds to the second scenario of FIG. 8. Panel c) depicts a third scenario in case of a moving device. In this third scenario, when the device 130 is in a yellow cell and the first node 101 may predict that it is to be handed over soon to a green cell with sufficient energy, then the first node 101 may determine, in Action 304, to recommend that the application, provided it is able to delay data transfer in the client, may delay data transfer to save energy in the yellow cell and utilize the resources in the predicted green cell. If either the device 130 is not predicted to change from yellow to green, or if the next cell is not a green cell with sufficient energy, or the UE is not moving, or if the UE application is not delayable, the first node 101 may determine to recommend normal data transfer.

If the first node 101 may predict that it is to be handed over soon to a red cell, then the first node 101 may determine, in Action 304, to recommend that the application, provided it is able to cache data in the client, may download more data and cache it to use the resources of the yellow cell, and save more energy in the predicted red cell. If either the device 130 is not predicted to change from yellow to red, or the UE is not moving, or the UE application is not cacheable, the first node 101 may determine to recommend normal data transfer.

Figure 10:
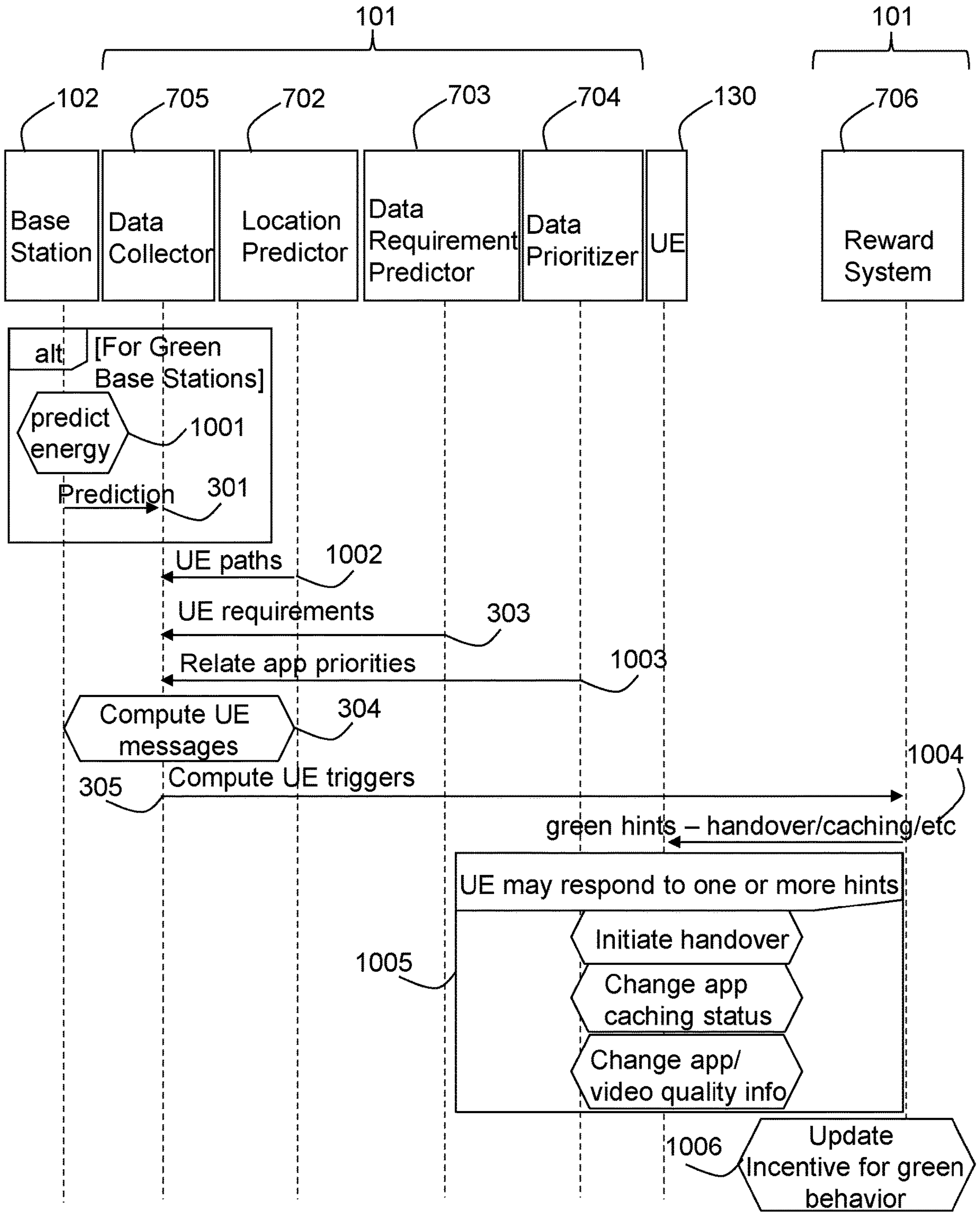
FIG. 10 is a sequence diagram illustrating the components and their interactions in a communications system, according to embodiments herein.

FIG. 10 is a signalling diagram illustrating a non-limiting example of the interaction between the first node 101, the second node 102 and the device 130, according to embodiments herein. In this example, the energy predictor is comprised in the second node 102, in the second network node 112, a base station. The first node 101 is shown by some of its components: the data collector 705, the location predictor 702, the data requirement predictor 703, the data prioritizer 704, and the reward system 706. In this alternative, the second node 102 may determine the predicted amount of energy available at the second network node 112 at 1001, which the first node 101 in agreement with Action 301. At 1002, the location predictor 702 may provide the paths of the device 130, a UE, to the data collector 705. The data requirement predictor 703 may determine the data requirements of the device 130 in agreement with Action 303. At 1003, the data prioritizer 704 may provide the application priorities to the data collector 705. For example, certain applications, such as video conferencing, may want to work despite being in the "red" zones. Applications may provide these priorities. In Action 304, the data collector 705, with the information collected, determines the scheduling and computes the UE messages, which the first node 101 initiates providing to the device 130 in agreement with Action 305, by first computing and providing UE triggers to the reward system 706. At 1004, the reward system 706 provides green hints regarding handover, caching, etc . . . to the device 130. At 1005, the device 130 may respond to the one or more hints by one of: initiating handover, changing the caching status of the application that may be in use, by changing the application, e.g., information on the video quality. At 1006, the reward system may update the incentive for green behavior, e.g., if the device 130 may have deviated from the recommendation, although not necessarily for this case. If the update is in response to the device 130 having deviated from the predicted route 140 or overwritten the recommended timeline, the update may be in agreement with Action 309.

With regards to the handling of the energy tags, the following is proposed regarding base station signaling in embodiments herein. Following ultra-lean design principles, 5G NR intends to avoid "always ON" signals as much as possible to save energy both on the base stations and on the user equipment. These are the signalling mechanisms between UEs such as the device 130, and base stations such as the first network node 111 and the second network node 112. First, Channel State Information-Reference Signal (CSI-RS), a type of reference signal, may be sent in an aperiodic manner to assess the downlink channel. Similarly, the uplink may be assessed via the Sounding Reference Signals (SRS). After a device or UE has sounded the channel, it may start the reporting of the measurements to the network. Some of the reported quantities may be the Channel Quality Indicator (CQI), mainly used for scheduling, Reference Signal Received Power (RSRP) used for handover, beam management and radio resource management, and Signal-to-Interference plus Noise Ratio (SINR) used for handover. These signalling information CSI, and/or CQI may be with tags such as "green" and "red" for energy aware signalling. These headers may be used by the UEs such as the device 130 and the other devices 131 to generate energy efficient policies.

Embodiments disclosed herein may be understood to provide the advantage of enabling to optimize data transmission to the devices to maximize green energy usage.

As a further advantage, embodiments disclosed herein may be understood to enable energy and QoS efficient budgeting of base stations and devices to improve carbon footprint framework.

Figure 11:
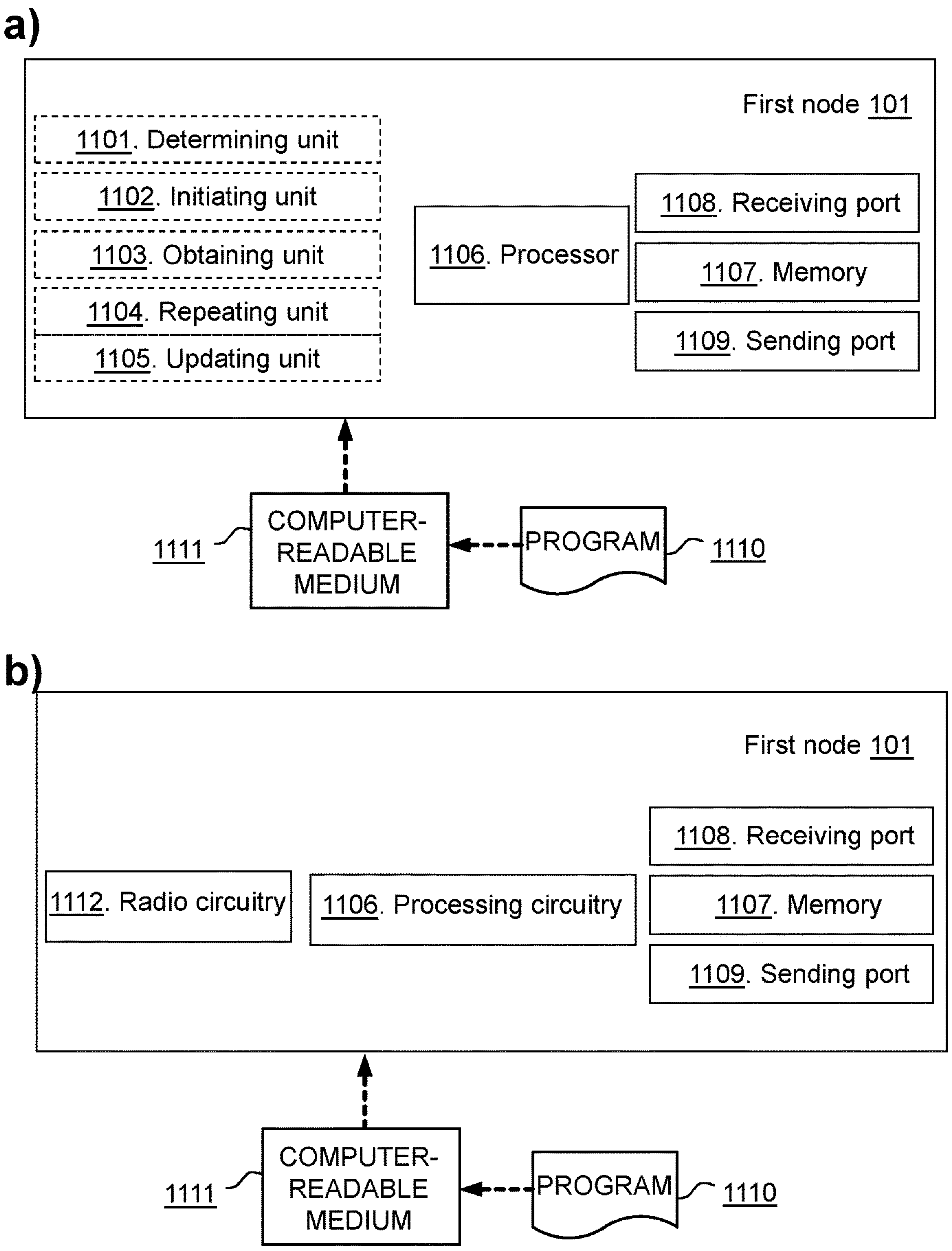
FIG. 11 is a schematic block diagram illustrating two non-limiting examples, a) and b), of a first node, according to embodiments herein.

FIG. 11 depicts two different examples in panels a) and b), respectively, of the arrangement that the first node 101 may comprise. In some embodiments, the first node 101 may comprise the following arrangement depicted in FIG. 11*a*. The first node 101 may be understood to be for managing the one or more indications. The first node 101 is configured to operate in the communications system 100.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 101 and will thus not be repeated here. For example, based on historical data, the first node 101, e.g., via an Artificial Intelligence (AI) based algorithm may be configured to predict the possible movements of the device 130 in next n-steps, that is, the first node 101 may be configured to predict the predicted route 140 of the device 130.

In FIG. 11, optional units are indicated with dashed boxes.

The first node 101 is configured to, e.g. by means of a determining unit 1101 within the first node 101 configured to, determine the scheduling of the transfer of data to or from the device 130 along the predicted route 140 configured to be followed by the device 130 during the time period. The determining of the scheduling may be configured to be further based on the type of energy configured to be used by the plurality of cells 121, 122 configured to be providing radio coverage along the predicted route 140.

The first node 101 is further configured to, e.g. by means of an initiating unit 1102 within the first node 101 configured to, initiate providing the one or more indications to the device 130 based on the first result of the determining of the scheduling.

In some embodiments, the determining of the scheduling may be configured to be performed using machine learning.

In some embodiments, the determining of the scheduling may be configured to comprise determining whether the transfer of data is to be initiated at the first cell 121 configured to be comprised in the plurality of cells 121, 122, or delayed until the device 130 reaches the second cell 122 configured to be comprised in the plurality of cells 121, 122, based on the predicted route 140 to be followed by the device 130 during the time period. The determining of the scheduling may be further configured to be based on at least one or more of: a) whether or not the first cell 121 may be configured to use renewable energy, partially or entirely, b) whether or not the second cell 122 may be configured to use renewable energy, partially or entirely, c) the first location of the device 130 with respect to the second location of the second cell 122, d) the data requirement for the transfer along the predicted route 140, and e) the predicted amount of energy available at the second network node 112 configured to be serving the second cell 122, based on the predicted route 140.

In some embodiments, the determining of the scheduling may be further configured to be based on at least one or more of: a) the predicted signal strength of the first cell 121 and the second cell 122 during the time period, b) the number of other wireless devices 131 in the vicinity of the first cell 121 and the second cell 122 during the time period, the number being one of predicted, observed or both, c) the first historical data on the data transfers at the first cell 121 and the second cell 122, d) the second historical data on the energy usage by the first network node 111 configured to be serving the first cell 121 and the second network node 112 configured to be serving the second cell 122, and e) the predicted weather during the time period at the respective location of the first network node 111 and the second network node 112.

In some embodiments wherein the one or more indications may be configured to indicate at least one or more of: a) the data requirement for the transfer along the predicted route 140, b) the plurality of cells 121, 122 along the predicted route 140, c) whether or not the plurality of cells 121, 122 use, respectively, renewable energy, partially or entirely, d) the respective signal strength of the plurality of cells 121, 122, e) the respective predicted amount of energy available at the respective network nodes 110 configured to be respectively serving the plurality of cells 121, 122, f) the predicted amount of energy available at the second network node 112 and the predicted amount of energy available at the first network node 111 configured to be serving the first cell 121, g) the timeline of the transfer of data along the route, wherein the timeline may be one of: i) the instruction to be applied by the device 130, and ii) the recommendation overwritable by the device 130, h) the potential downtime of the device 130 based on the timeline, and i) the predicted impact on the QoE based on the timeline.

In some embodiments, the determining of the scheduling may be configured to be further based on at least one or more of: a) the priority of the transfer of data, and b) whether or not the data to be transferred may be cacheable or delayable.

In some embodiments, wherein the one or more indications may be configured to be one or more second indications, the first node 101 may be further configured to, e.g. by means of an obtaining unit 1103 within the first node 101 configured to, obtain the first indication configured to be received from the device 130 and configured to indicate the one or more preferences for the data transfer. The determining of the scheduling may be further configured to be based on the first indication configured to be obtained.

In some embodiments wherein the one or more indications may be configured to be one or more second indications, the first node 101 may be further configured to, e.g. by means of the obtaining unit 1103 within the first node 101 configured to, obtain at least one of: i) the third indication configured to indicate the device 130 has deviated from the predicted route 140 during the time period, and ii) the fourth indication configured to indicate the device 130 may have overwritten the recommended timeline of the transfer of data along the predicted route 140 configured to be indicated by the one or more second indications.

In some embodiments wherein the one or more indications may be configured to be one or more second indications, the first node 101 may be further configured to, e.g. by means of a repeating unit 1104 within the first node 101 configured to, repeat the determining of the scheduling based on the at least one of the third indication and the fourth indication configured to be obtained.

The first node 101 may be further configured to, e.g. by means of the initiating unit 1102 within the first node 101 configured to, initiate providing the one or more updated indications to the device 130 based on the result of the determination configured to be repeated.

In some embodiments, the first node 101 may be further configured to, e.g. by means of an updating unit 1105 within the first node 101 configured to, update the predicted route 140 to be followed by the device 130 during the time period. The repeating of the determining of the scheduling may be configured to be based on the predicted route 140 configured to be updated.

In some embodiments, the first node 101 may be further configured to, e.g. by means of the obtaining unit 1103 within the first node 101 configured to, obtain, autonomously or from the second node 102 configured to operate in the communications system 100, the predicted amount of energy available at the second network node 112 configured to be serving the second cell 122.

In some embodiments, the first node 101 may be configured to, e.g. by means of the determining unit 1101 within the first node 101 configured to, determine, using machine learning, the data requirement for the transfer along the predicted route 140. The determining of the data requirement may be configured to be based on at least one or more of: i) the third historical data on data requirements for the device 130, other devices, or both, ii) the respective location and respective type of the plurality of cells 121, 122 along the predicted route 140, with respect to usage of renewable energy, iii) the expected next cell 153 for the device 130 along the predicted route 140, iv) the expected data requirement for the device 130 during the time period, and v) whether or not the category of the data to be transferred may be configured to be cacheable data or delayable data.

In some embodiments, the one or more indications may be configured to further indicate the reward for the device 130 with the proviso the device 130 follows the recommended timeline for the data transfer.

The embodiments herein in the first node 101 may be implemented through one or more processors, such as a processor 1106 in the first node 101 depicted in FIG. 11*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 101. One such carrier may be in the form of a CD ROM disc. It is however feasible with other data carriers such as a memory stick. The computer program code may furthermore be provided as pure program code on a server and downloaded to the first node 101.

The first node 101 may further comprise a memory 1107 comprising one or more memory units. The memory 1107 is arranged to be used to store obtained information, store data, configurations, schedulings, and applications etc. to perform the methods herein when being executed in the first node 101.

In some embodiments, the first node 101 may receive information from, e.g., the second node 112, the first network node 111, the second network node 112, the device 130, the other devices 131, or any other node or device, through a receiving port 1108. In some embodiments, the receiving port 1108 may be, for example, connected to one or more antennas in first node 101. In other embodiments, the first node 101 may receive information from another structure in the communications system 100 through the receiving port 1108. Since the receiving port 1108 may be in communication with the processor 1106, the receiving port 1108 may then send the received information to the processor 1106. The receiving port 1108 may also be configured to receive other information.

The processor 1106 in the first node 101 may be further configured to transmit or send information to e.g., the second node 112, the first network node 111, the second network node 112, the device 130, the other devices 131, any other node or device and/or another structure in the communications system 100, through a sending port 1109, which may be in communication with the processor 1106, and the memory 1107.

Those skilled in the art will also appreciate that the units 1101-1105 described above may refer to a combination of analog and digital circuits, and/or one or more processors configured with software and/or firmware, e.g., stored in memory, that, when executed by the one or more processors such as the processor 1106, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1105 described above may be implemented as one or more applications running on one or more processors such as the processor 1106.

Thus, the methods according to the embodiments described herein for the first node 101 may be respectively implemented by means of a computer program 1110 product, comprising instructions, i.e., software code portions, which, when executed on at least one processor 1106, cause the at least one processor 1106 to carry out the actions described herein, as performed by the first node 101. The computer program 1110 product may be stored on a computer-readable storage medium 1111. The computer-readable storage medium 1111, having stored thereon the computer program 1110, may comprise instructions which, when executed on at least one processor 1106, cause the at least one processor 1106 to carry out the actions described herein, as performed by the first node 101. In some embodiments, the computer-readable storage medium 1111 may be a non-transitory computer-readable storage medium, such as a CD ROM disc, or a memory stick. In other embodiments, the computer program 1110 product may be stored on a carrier containing the computer program 1110 just described, wherein the carrier is one of an electronic signal, optical signal, radio signal, or the computer-readable storage medium 1111, as described above.

The first node 101 may comprise a communication interface configured to facilitate communications between the first node 101 and other nodes or devices, e.g., the second node 112, the first network node 111, the second network node 112, the device 130, the other devices 131, any other node or device and/or another structure in the communications system 100. The interface may, for example, include a transceiver configured to transmit and receive radio signals over an air interface in accordance with a suitable standard.

In other embodiments, the first node 101 may comprise the following arrangement depicted in FIG. 11*b*. The first node 101 may comprise a processing circuitry 1106, e.g., one or more processors such as the processor 1106, in the first node 101 and the memory 1107. The first node 101 may also comprise a radio circuitry 1112, which may comprise e.g., the receiving port 1108 and the sending port 1109. The processing circuitry 1106 may be configured to, or operable to, perform the method actions according to FIG. 3, and/or FIGS. 5-10, in a similar manner as that described in relation to FIG. 11*a*. The radio circuitry 1112 may be configured to set up and maintain at least a wireless connection with the second node 112, the first network node 111, the second network node 112, the device 130, the other devices 131, any other node or device and/or another structure in the communications system 100. Circuitry may be understood herein as a hardware component.

Hence, embodiments herein also relate to the first node 101 operative to operate in the communications system 100. The first node 101 may comprise the processing circuitry 1106 and the memory 1107, said memory 1107 containing instructions executable by said processing circuitry 1106, whereby the first node 101 is further operative to perform the actions described herein in relation to the first node 101, e.g., in FIG. 3, and/or FIGS. 5-10.

Figure 12:
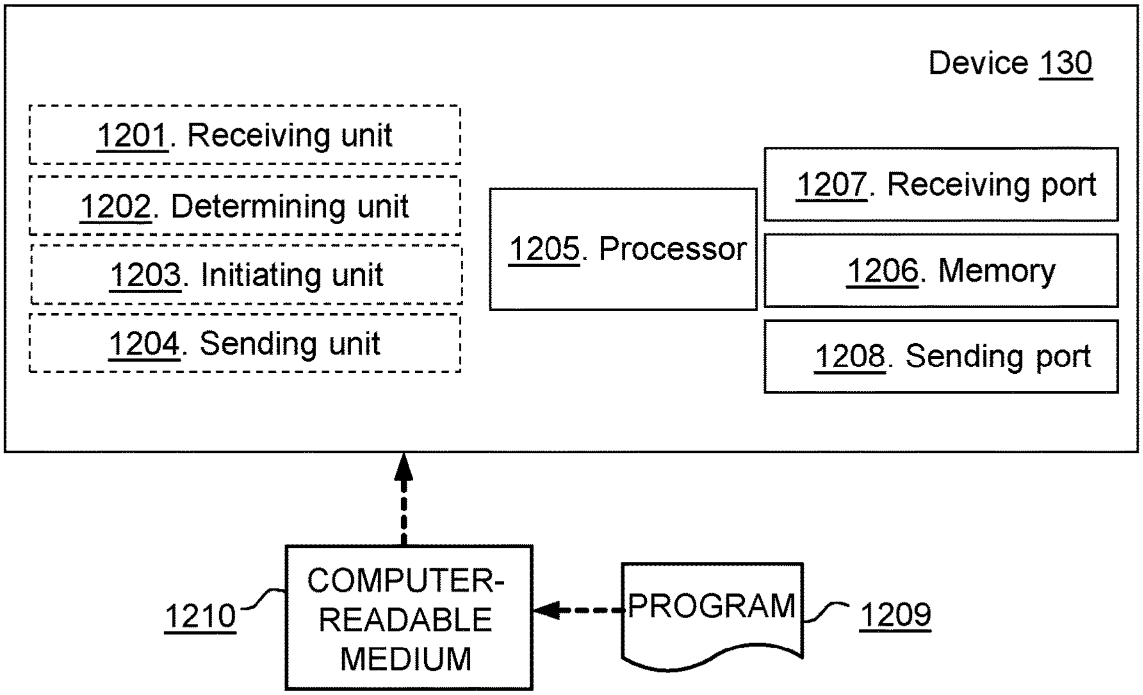
FIG. 12 is a schematic block diagram illustrating two non-limiting examples, a) and b), of a device, according to embodiments herein.
Figure 12:
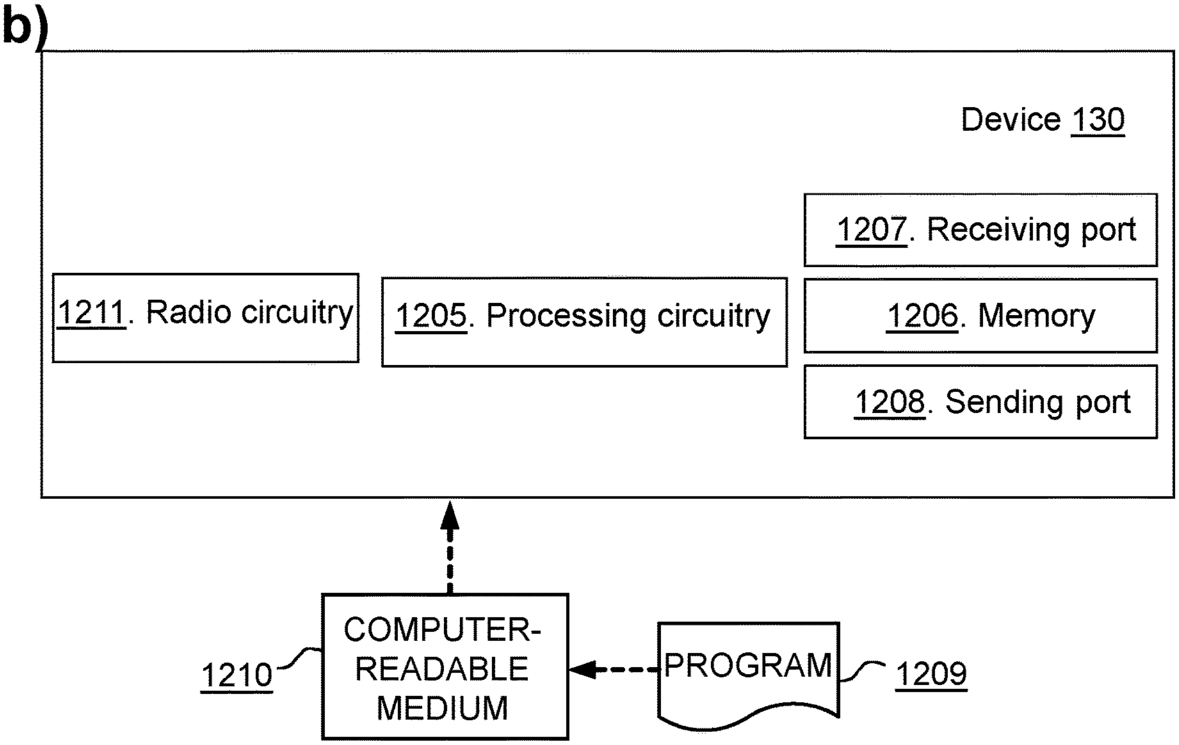

FIG. 12 depicts two different examples in panels a) and b), respectively, of the arrangement that the device 130 may comprise. In some embodiments, the device 130 may comprise the following arrangement depicted in FIG. 12*a*. The device 130 may be understood to be for managing the one or more indications. The device 130 is configured to operate in the communications system 100.

Several embodiments are comprised herein. Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the device 130 and will thus not be repeated here. For example, if minimum data is configured to be transmitted between the device 130 and a red base station, the device 130 may be configured to get more positive points.

In FIG. 12, optional units are indicated with dashed boxes.

The device 130 is configured to, e.g. by means of a receiving unit 1201 within the device 130 configured to, receive, from the first node 101 configured to operate in the communications system 100, the one or more indications. The one or more indications may be configured to indicate the scheduling of the transfer of data to or from the device 130 along the predicted route 140 to be followed by the device 130 during the time period. The one or more indications may be further configured to be based on the type of energy configured to be used by the plurality of cells 121, 122 configured to be providing radio coverage along the predicted route 140.

The device 130 is configured to, e.g. by means of a determining unit 1202 within the device 130 configured to, determine whether or not to perform the data transfer based on the one or more indications configured to be received.

The device 130 may be configured to, e.g. by means of an initiating unit 1203 within the device 130 configured to, initiate performing the data transfer according to the second result of the determining.

In some embodiments, wherein the one or more indications may be configured to further indicate whether the transfer of data is to be initiated at the first cell 121 configured to be comprised in the plurality of cells 121, 122, or delayed until the device 130 reaches the second cell 122 configured to be comprised in the plurality of cells 121, 122, based on the predicted route 140 to be followed by the device 130 during the time period, the one or more indications may be further configured to be based on at least one or more of: a) whether or not the first cell 121 may be configured to use renewable energy, partially or entirely, b) whether or not the second cell 122 may be configured to use renewable energy, partially or entirely, c) the first location of the device 130 with respect to the second location of the second cell 122, d) the data requirement for the transfer along the predicted route 140, and e) the predicted amount of energy available at the second network node 112 configured to be serving the second cell 122, based on the predicted route 140.

In some embodiments, the one or more indications may be further configured to be based on at least one or more of: a) the predicted signal strength of the first cell 121 and the second cell 122 during the time period, b) the number of other wireless devices 131 in the vicinity of the first cell 121 and the second cell 122 during the time period, the number being one of predicted, observed or both, c) the first historical data on the data transfers at the first cell 121 and the second cell 122, d) the second historical data on the energy usage by the first network node 111 configured to be serving the first cell 121 and the second network node 112 configured to be serving the second cell 122, and e) the predicted weather during the time period at the respective location of the first network node 111 and the second network node 112.

In some embodiments wherein the one or more indications may be configured to indicate at least one or more of: a) the data requirement for the transfer along the predicted route 140, b) the plurality of cells 121, 122 along the predicted route 140, c) whether or not the plurality of cells 121, 122 use, respectively, renewable energy, partially or entirely, d) the respective signal strength of the plurality of cells 121, 122, e) the respective predicted amount of energy available at the respective network nodes 110 configured to be respectively serving the plurality of cells 121, 122, f) the predicted amount of energy available at the second network node 112 and the predicted amount of energy available at the first network node 111 configured to be serving the first cell 121, g) the timeline of the transfer of data along the route, wherein the timeline may be one of: i) the instruction to be applied by the device 130, and ii) the recommendation overwritable by the device 130, h) the potential downtime of the device 130 based on the timeline, and i) the predicted impact on the QoE based on the timeline.

In some embodiments, the one or more indications may be further configured to be based on at least one or more of: a) the priority of the transfer of data, and b) whether or not the data to be transferred may be configured to be cacheable or delayable.

In some embodiments wherein the one or more indications may be configured to be one or more second indications, the device 130 may be configured to, e.g. by means of a sending unit 1204 within the device 130 configured to, send, to the first node 101, the first indication configured to indicate the one or more preferences for the data transfer, and the one or more indications configured to be received may be further configured to be based on the first indication configured to be sent.

In some embodiments wherein the one or more indications may be configured to be one or more second indications, the device 130 may be further configured to, e.g. by means of the sending unit 1204 within the device 130 configured to, send, to the first node 101, based on the second result of the determining, at least one of: i) the third indication configured to indicate the device 130 has deviated from the predicted route 140 during the time period, and ii) the fourth indication configured to indicate the device 130 may have overwritten the recommended timeline of the transfer of data along the predicted route 140 configured to be indicated by the one or more second indications.

The device 130 may be further configured to, e.g. by means of the receiving unit 1201 within the device 130 configured to, receive the one or more updated indications from the first node 101, based on the at least one of the third indication and the fourth indication configured to be sent.

In some embodiments, the one or more updated indications may be configured to be based on the updated predicted route 140 to be followed by the device 130 during the time period.

In some embodiments, wherein the one or more indications may be further configured to be based on the data requirement for the transfer along the predicted route 140, the data requirement may be based on at least one or more of: i) the third historical data on the data requirements for the device 130, other devices, or both, ii) the respective location and the respective type of the plurality of cells 121, 122 along the predicted route 140, with respect to the usage of renewable energy, iii) the expected next cell 153 for the device 130 along the predicted route 140, iv) the expected data requirement for the device 130 during the time period, and v) whether or not the category of the data to be transferred may be configured to be cacheable data or delayable data.

In some embodiments, the one or more indications may be further configured to indicate the reward for the device 130 with the proviso the device 130 follows the recommended timeline for the data transfer.

The embodiments herein in the device 130 may be implemented through one or more processors, such as a processor 1205 in the device 130 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the device 130. One such carrier may be in the form of a CD ROM disc. It is however feasible with other data carriers such as a memory stick. The computer program code may furthermore be provided as pure program code on a server and downloaded to the device 130.

The device 130 may further comprise a memory 1206 comprising one or more memory units. The memory 1206 is arranged to be used to store obtained information, store data, configurations, schedulings, and applications etc. to perform the methods herein when being executed in the device 130.

In some embodiments, the device 130 may receive information from, e.g., the first node 101, the second node 112, the first network node 111, the second network node 112, the other devices 131, any other node or device and/or another structure in the communications system 100, any other node, and/or another structure in the communications system 100, through a receiving port 1207. In some embodiments, the receiving port 1207 may be, for example, connected to one or more antennas in the device 130. Since the receiving port 1207 may be in communication with the processor 1205, the receiving port 1207 may then send the received information to the processor 1205. The receiving port 1207 may also be configured to receive other information.

The processor 1205 in the device 130 may be further configured to transmit or send information to e.g., the first node 101, the second node 112, the first network node 111, the second network node 112, the other devices 131, any other node or device and/or another structure in the communications system 100, any other node, and/or another structure in the communications system 100, through a sending port 1208, which may be in communication with the processor 1205, and the memory 1206.

Those skilled in the art will also appreciate that the units 1201-1204 described above may refer to a combination of analog and digital circuits, and/or one or more processors configured with software and/or firmware, e.g., stored in memory, that, when executed by the one or more processors such as the processor 1205, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1201-1204 described above may be implemented as one or more applications running on one or more processors such as the processor 1205.

Thus, the methods according to the embodiments described herein for the device 130 may be respectively implemented by means of a computer program 1209 product, comprising instructions, i.e., software code portions, which, when executed on at least one processor 1205, cause the at least one processor 1205 to carry out the actions described herein, as performed by the device 130. The computer program 1209 product may be stored on a computer-readable storage medium 1210. The computer-readable storage medium 1210, having stored thereon the computer program 1209, may comprise instructions which, when executed on at least one processor 1205, cause the at least one processor 1205 to carry out the actions described herein, as performed by the device 130. In some embodiments, the computer-readable storage medium 1210 may be a non-transitory computer-readable storage medium, such as a CD ROM disc, or a memory stick. In other embodiments, the computer program 1209 product may be stored on a carrier containing the computer program 1209 just described, wherein the carrier is one of an electronic signal, optical signal, radio signal, or the computer-readable storage medium 1210, as described above.

The device 130 may comprise a communication interface configured to facilitate communications between the device 130 and other nodes or devices, e.g., the first node 101, the second node 112, the first network node 111, the second network node 112, the other devices 131, any other node or device and/or another structure in the communications system 100, any other node, and/or another structure in the communications system 100. The interface may, for example, include a transceiver configured to transmit and receive radio signals over an air interface in accordance with a suitable standard.

In other embodiments, the device 130 may comprise the following arrangement depicted in FIG. 12*b*. The device 130 may comprise a processing circuitry 1205, e.g., one or more processors such as the processor 1205, in the device 130 and the memory 1206. The device 130 may also comprise a radio circuitry 1211, which may comprise e.g., the receiving port 1207 and the sending port 1208. The processing circuitry 1205 may be configured to, or operable to, perform the method actions according to FIG. 4 and/or FIGS. 5-10, in a similar manner as that described in relation to FIG. 12*a*. The radio circuitry 1211 may be configured to set up and maintain at least a wireless connection with the first node 101, the second node 112, the first network node 111, the second network node 112, the other devices 131, any other node or device and/or another structure in the communications system 100, any other node, and/or another structure in the communications system 100. Circuitry may be understood herein as a hardware component.

Hence, embodiments herein also relate to the device 130 operative to operate in the communications system 100. The device 130 may comprise the processing circuitry 1205 and the memory 1206, said memory 1206 containing instructions executable by said processing circuitry 1205, whereby the device 130 is further operative to perform the actions described herein in relation to the device 130, e.g., in FIG. 4 and/or FIGS. 5-10.

Embodiments herein may also comprise the communications system 100, e.g., comprising the first node 101 and the device 130, according to any of the above described embodiments.

Embodiments herein may also comprise the communications system 100, e.g., comprising the first node 101 and the device 130, according to any of the above described embodiments, and any of the above described optional embodiments.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

The invention claimed is:

1. A computer-implemented method, performed by a first node, the method being for managing one or more indications, the first node operating in a communications system, the method comprising:

determining a scheduling of a transfer of data to or from a device along a predicted route to be followed by the device during a time period, the determining of the scheduling being further based on a type of energy used by a plurality of cells providing radio coverage along the predicted route, wherein determining the scheduling of the transfer of data to or from the device along the predicted route comprises determining whether to initiate the transfer of data at a first cell providing radio coverage on the predicted route, or to delay the transfer of data until the device reaches a second cell providing radio coverage on the predicted route, based on:

a. whether or not the first cell uses renewable energy; and/or b. whether or not the second cell uses renewable energy; and initiating providing one or more indications to the device based on a first result of the determining of the scheduling.

2. The method according to claim 1, wherein the determining comprises determining whether the transfer of data is to be initiated at the first cell comprised in the plurality of cells, or delayed until the device reaches the second cell comprised in the plurality of cells, based on the predicted route to be followed by the device during the time period, the determining of the scheduling being further based on at least one or more of:

a. a first location of the device with respect to a second location of the second cell, b. a data requirement for the transfer along the predicted route, and c. a predicted amount of energy available at a second network node serving the second cell, based on the predicted route.

3. The method according to claim 2, wherein the one or more indications indicate at least one or more of:

a. the data requirement for the transfer along the predicted route, b. the plurality of cells along the predicted route, c. whether or not the plurality of cells use, respectively, renewable energy, partially or entirely, d. respective signal strength of the plurality of cells, e. respective predicted amounts of energy available at the respective network nodes respectively serving the plurality of cells, f. the predicted amount of energy available at the second network node and a predicted amount of energy available at a first network node serving the first cell, g. a timeline of the transfer of data along the route, wherein the timeline is one of: i) an instruction to be applied by the device, and ii) a recommendation overwritable by the device, h. a potential downtime of the device based on the timeline, and i. a predicted impact on a Quality of Experience based on the timeline.

4. The method according to claim 1, wherein determining of the scheduling is further based on at least one or more of:

a. a priority of the transfer of data, and b. whether or not the data to be transferred is cacheable or delayable.

5. The method according to claim 1, wherein the one or more indications further indicate a reward for the device with the proviso the device follows a recommended timeline for the data transfer.

6. The method according to claim 1, wherein the one or more indications further indicate a reward for the device that incentivizes the device to maximize use of cells that use renewable energy for the transfer of data.

7. A method, performed by a device, the method being for managing one or more indications, the device operating in a communications system, the method comprising:

receiving, from a first node operating in the communications system, one or more indications, the one or more indications indicating a scheduling of a transfer of data to or from the device along a predicted route to be followed by the device during a time period, the one or more indications being further based on a type of energy used by a plurality of cells providing radio coverage along the predicted route, wherein the one or more indications indicate whether the transfer of data is to be initiated at a first cell providing radio coverage on the predicted route, or is to be delayed until the device reaches a second cell providing radio coverage on the predicted route, based on:

a. whether or not the first cell uses renewable energy; and/or b. whether or not the second cell uses renewable energy;

determining whether or not to perform the data transfer based on the received one or more indications; and initiating performing the data transfer according to a second result of the determining.

8. The method according to claim 7, wherein the one or more indications further indicate whether the transfer of data is to be initiated at the first cell comprised in the plurality of cells, or delayed until the device reaches the second cell comprised in the plurality of cells, based on the predicted route to be followed by the device during the time period, the one or more indications being further based on at least one or more of:

a. a first location of the device with respect to a second location of the second cell, b. a data requirement for the transfer along the predicted route, and c. a predicted amount of energy available at a second network node serving the second cell, based on the predicted route.

9. The method according to claim 8, wherein the one or more indications indicate at least one or more of:

a. the data requirement for the transfer along the predicted route,
b. the plurality of cells along the predicted route,
c. whether or not the plurality of cells use, respectively, renewable energy, partially or entirely,
d. respective signal strength of the plurality of cells,
e. respective predicted amount of energy available at the respective network nodes respectively serving the plurality of cells,
f. the predicted amount of energy available at the second network node and a predicted amount of energy available at a first network node serving the first cell,
g. a timeline of the transfer of data along the route, wherein the timeline is one of: i) an instruction to be applied by the device, and ii) a recommendation overwritable by the device,
h. a potential downtime of the device based on the timeline, and
i. a predicted impact on a Quality of Experience based on the timeline.

10. The method according to claim 7, wherein the one or more indications are further based on at least one or more of:

a. a priority of the transfer of data, and
b. whether or not the data to be transferred is cacheable or delayable.

11. The method according to claim 7, wherein the one or more indications further indicate a reward for the device with the proviso the device follows a recommended timeline for the data transfer.

12. A first node, for managing one or more indications, the first node being configured to operate in a communications system, the first node comprising:

radio circuitry; and
processing circuitry configured to:
determine a scheduling of a transfer of data to or from a device along a predicted route configured to be followed by the device during a time period, the determining of the scheduling being configured to be further based on a type of energy configured to be used by a plurality of cells configured to be providing radio coverage along the predicted route, wherein determining the scheduling of the transfer of data to or from the device along the predicted route comprises determining whether to initiate the transfer of data at a first cell providing radio coverage on the predicted route, or to delay the transfer of data until the device reaches a second cell providing radio coverage on the predicted route, based on:
a. whether or not the first cell uses renewable energy; and/or
b. whether or not the second cell uses renewable energy; and
initiate providing one or more indications to the device based on a first result of the determining of the scheduling.

13. The first node according to claim 12, wherein the processing circuitry is configured to determine the scheduling by determining whether the transfer of data is to be initiated at the first cell configured to be comprised in the plurality of cells, or delayed until the device reaches the second cell configured to be comprised in the plurality of cells, based on the predicted route to be followed by the device during the time period, wherein the processing circuitry is configured to determine the scheduling based on at least one or more of:

a. a first location of the device with respect to a second location of the second cell,
b. a data requirement for the transfer along the predicted route, and
c. a predicted amount of energy available at a second network node configured to be serving the second cell, based on the predicted route.

14. The first node according to claim 13, wherein the one or more indications indicate at least one or more of:

a. the data requirement for the transfer along the predicted route,
b. the plurality of cells along the predicted route,
c. whether or not the plurality of cells use, respectively, renewable energy, partially or entirely,
d. respective signal strength of the plurality of cells,
e. respective predicted amount of energy available at the respective network nodes configured to be respectively serving the plurality of cells,
f. the predicted amount of energy available at the second network node and a predicted amount of energy available at a first network node configured to be serving the first cell,
g. a timeline of the transfer of data along the route, wherein the timeline is one of: i) an instruction to be applied by the device, and ii) a recommendation overwritable by the device,
h. a potential downtime of the device based on the timeline, and
i. a predicted impact on a Quality of Experience based on the timeline.

15. The first node according to claim 12, wherein the processing circuitry is configured to determine the scheduling based on at least one or more of:

a. a priority of the transfer of data, and
b. whether or not the data to be transferred is configured to be cacheable or delayable.

16. The first node according to claim 12, wherein the one or more indications further indicate a reward for the device with the proviso the device follows a recommended timeline for the data transfer.

17. A device, for managing one or more indications, the device being configured to operate in a communications system, the device comprising:

radio circuitry; and
processing circuitry configured to:
receive, from a first node configured to operate in the communications system, one or more indications, the one or more indications being configured to indicate a scheduling of a transfer of data to or from the device along a predicted route to be followed by the device during a time period, the one or more indications being further configured to be based on a type of energy configured to be used by a plurality of cells configured to be providing radio coverage along the predicted route, wherein the one or more indications indicate whether the transfer of data is to be initiated at a first cell providing radio coverage on the predicted route, or is to be delayed until the device reaches a second cell providing radio coverage on the predicted route, based on:
a. whether or not the first cell uses renewable energy; and/or
b. whether or not the second cell uses renewable energy;
determine whether or not to perform the data transfer based on the one or more indications configured to be received; and initiate performing the data transfer according to a second result of the determining.

18. The device according to claim 17, wherein the one or more indications further indicate whether the transfer of data is to be initiated at the first cell configured to be comprised in the plurality of cells, or delayed until the device reaches the second cell configured to be comprised in the plurality of cells, based on the predicted route to be followed by the device during the time period, the one or more indications being based on at least one or more of:

a. a first location of the device with respect to a second location of the second cell, b. a data requirement for the transfer along the predicted route, and c. a predicted amount of energy available at a second network node configured to be serving the second cell, based on the predicted route.

19. The device according to claim 17, wherein the one or more indications indicate at least one or more of:

a. the data requirement for the transfer along the predicted route, b. the plurality of cells along the predicted route, c. whether or not the plurality of cells use, respectively, renewable energy, partially or entirely, d. respective signal strength of the plurality of cells, e. respective predicted amount of energy available at the respective network nodes configured to be respectively serving the plurality of cells, f. the predicted amount of energy available at the second network node and a predicted amount of energy available at a first network node configured to be serving the first cell, g. a timeline of the transfer of data along the route, wherein the timeline is one of: i) an instruction to be applied by the device, and ii) a recommendation overwritable by the device, h. a potential downtime of the device based on the timeline, and i. a predicted impact on a Quality of Experience based on the timeline.

20. The device according to claim 17, wherein the one or more indications are based on at least one or more of:

a. a priority of the transfer of data, and b. whether or not the data to be transferred is configured to be cacheable or delayable.

21. The device according to claim 17, wherein the one or more indications further indicate a reward for the device with the proviso the device follows a recommended timeline for the data transfer.

* * * * *